United States Patent
Kobayashi et al.

(10) Patent No.: US 11,011,167 B2
(45) Date of Patent: May 18, 2021

(54) COMMUNICATION SYSTEM, COMMUNICATION METHOD, AND COMPUTER-READABLE STORAGE MEDIUM

(71) Applicant: Toyota Jidosha Kabushiki Kaisha, Toyota (JP)

(72) Inventors: Hideki Kobayashi, Miyoshi (JP); Akihiro Muguruma, Nagoya (JP); Yukiya Sugiyama, Toyota (JP); Shota Higashihara, Chiryu (JP); Riho Matsuo, Nagoya (JP); Naoki Yamamuro, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 103 days.

(21) Appl. No.: 16/242,341

(22) Filed: Jan. 8, 2019

(65) Prior Publication Data

US 2019/0214006 A1 Jul. 11, 2019

(30) Foreign Application Priority Data

Jan. 10, 2018 (JP) .............................. JP2018-001783

(51) Int. Cl.
*G10L 15/22* (2006.01)
*G10L 15/32* (2013.01)
(Continued)

(52) U.S. Cl.
CPC .............. *G10L 15/22* (2013.01); *B60K 35/00* (2013.01); *G06F 3/167* (2013.01); *G10L 15/28* (2013.01);
(Continued)

(58) Field of Classification Search
CPC ... B60K 35/00; B60K 2370/148; G06F 3/017; G06F 3/167; G06F 40/51; G10L 15/22;
(Continued)

(56) References Cited

U.S. PATENT DOCUMENTS 6,965,863 B1 * 11/2005 Zuberec .................. G10L 15/22
704/231
6,999,930 B1 * 2/2006 Roberts ................. G10L 15/193
379/88.01

(Continued)

FOREIGN PATENT DOCUMENTS

JP 2009-300537 A 12/2009

*Primary Examiner* — Gerald Gauthier
(74) *Attorney, Agent, or Firm* — Dinsmore & Shohl LLP

(57) ABSTRACT

A communication system includes a pair of speech recognition devices that are capable of communicating with each other, each of the speech recognition devices including a speech input section into which speech is input, a speech recognition section that recognizes speech input to the speech input section, and a speech output section that outputs speech. The communication system also includes an information generation section that generates notification information corresponding to speech recognized by the speech recognition section in one speech recognition device from out of the pair of speech recognition devices, and a speech output control section that performs control to output notification speech corresponding to the notification information at a specific timing from the speech output section of the other speech recognition device from out of the pair of speech recognition devices.

10 Claims, 19 Drawing Sheets

(51) Int. Cl.
  *B60K 35/00* (2006.01)
  *G06F 3/16* (2006.01)
  *G10L 15/28* (2013.01)

(52) U.S. Cl.
  CPC ........ *G10L 15/32* (2013.01); *B60K 2370/148* (2019.05); *G10L 2015/223* (2013.01)

(58) Field of Classification Search
  CPC ......... G10L 15/28; G10L 15/32; G10L 25/60; G10L 2015/223; G10L 15/02; G10L 15/1822; G10L 15/30; G10L 15/63; H04W 4/023
  USPC ........ 704/9, 231, 235, 257, 270, 270.1, 275, 704/233, 246, 251, 3, 211; 715/200; 379/88.01; 382/190
  See application file for complete search history.

(56) References Cited

U.S. PATENT DOCUMENTS

| | | | | |
|---|---|---|---|---|
| 7,127,398 | B1* | 10/2006 | Yamagishi | G10L 15/1815 704/270 |
| 8,589,156 | B2* | 11/2013 | Burke | G10L 15/30 704/231 |
| 8,666,750 | B2* | 3/2014 | Buck | G10L 15/28 704/231 |
| 8,688,446 | B2* | 4/2014 | Yanagihara | G10L 15/26 455/563 |
| 8,825,468 | B2* | 9/2014 | Jacobsen | G06F 40/58 704/3 |
| 8,943,394 | B2* | 1/2015 | Weng | G10L 15/22 704/251 |
| 10,353,480 | B2* | 7/2019 | Roman | G06F 3/167 |
| 10,679,629 | B2* | 6/2020 | Pasko | G10L 15/22 |
| 2002/0046023 | A1* | 4/2002 | Fujii | G10L 15/32 704/231 |
| 2002/0181773 | A1* | 12/2002 | Higaki | G06F 3/017 382/190 |
| 2003/0012347 | A1* | 1/2003 | Steinbiss | G10L 15/063 379/88.01 |
| 2009/0234648 | A1* | 9/2009 | Nagatomo | G10L 15/22 704/235 |
| 2009/0292528 | A1* | 11/2009 | Kameyama | G10L 13/00 704/9 |
| 2012/0215528 | A1* | 8/2012 | Nagatomo | G10L 15/22 704/211 |
| 2014/0122075 | A1* | 5/2014 | Bak | G10L 15/32 704/246 |
| 2014/0278427 | A1* | 9/2014 | Riviere Escobedo | G10L 15/22 704/257 |
| 2014/0303969 | A1* | 10/2014 | Inose | G10L 15/22 704/231 |
| 2015/0019215 | A1* | 1/2015 | Shin | G10L 15/20 704/233 |
| 2015/0081271 | A1* | 3/2015 | Sumita | G10L 15/00 704/2 |
| 2015/0081274 | A1* | 3/2015 | Kawamura | G06F 40/58 704/3 |
| 2015/0149167 | A1* | 5/2015 | Beaufays | G10L 15/26 704/235 |
| 2015/0187351 | A1* | 7/2015 | Moon | G10L 15/22 704/231 |
| 2015/0243287 | A1* | 8/2015 | Nakano | G10L 17/22 704/246 |
| 2015/0279356 | A1* | 10/2015 | Lee | G10L 15/20 704/251 |
| 2016/0019886 | A1* | 1/2016 | Hong | G10L 15/24 704/231 |
| 2016/0180853 | A1 | 6/2016 | VanLund et al. | |
| 2017/0053650 | A1* | 2/2017 | Ogawa | G10L 15/063 |
| 2017/0076726 | A1* | 3/2017 | Bae | G10L 15/22 |
| 2017/0083285 | A1* | 3/2017 | Meyers | G10L 15/00 |
| 2018/0277106 | A1* | 9/2018 | Yoshida | G06Q 30/06 |
| 2018/0321905 | A1* | 11/2018 | Fountaine | G06F 16/683 |
| 2018/0336883 | A1* | 11/2018 | Li | G10L 15/14 |
| 2018/0342244 | A1* | 11/2018 | Thomsen | G10L 15/32 |
| 2019/0057703 | A1* | 2/2019 | Zeinstra | G10L 15/30 |
| 2019/0096399 | A1* | 3/2019 | Sasaki | G06F 40/51 |
| 2019/0140856 | A1* | 5/2019 | Choi | H04L 12/281 |
| 2019/0173687 | A1* | 6/2019 | MacKay | H04L 29/08648 |
| 2019/0214006 | A1* | 7/2019 | Kobayashi | G06F 3/167 |
| 2020/0034836 | A1* | 1/2020 | Shah | G06Q 40/08 |

\* cited by examiner

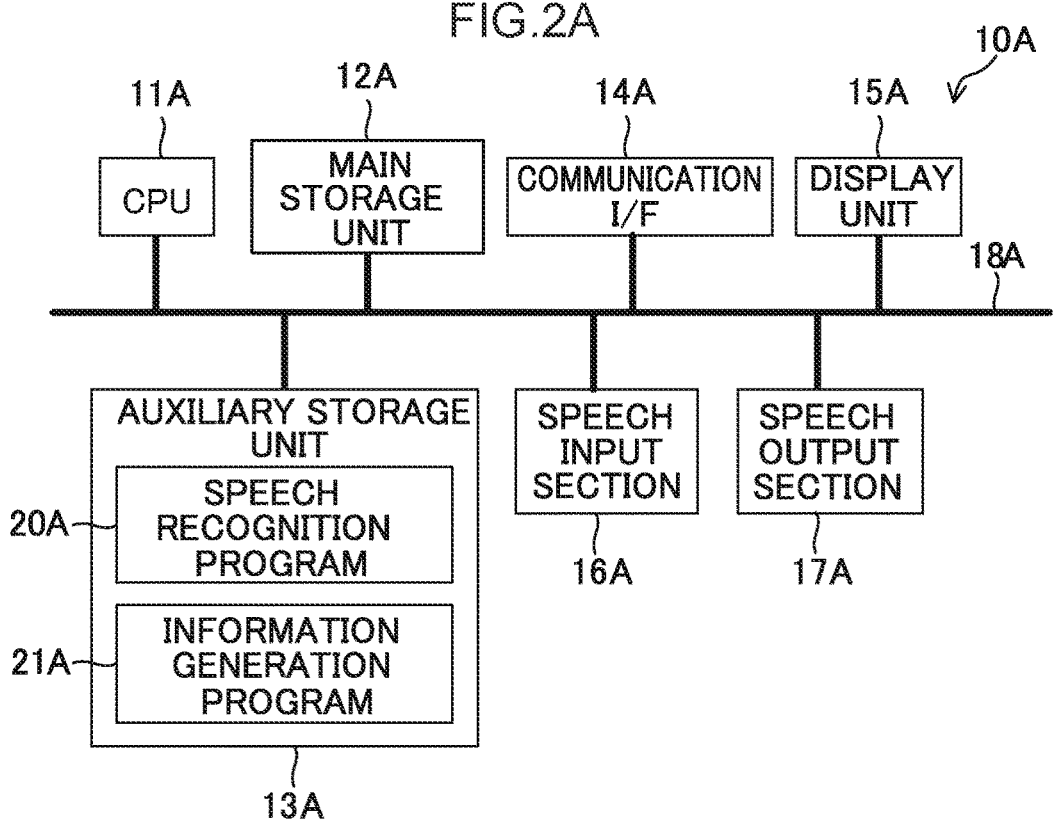
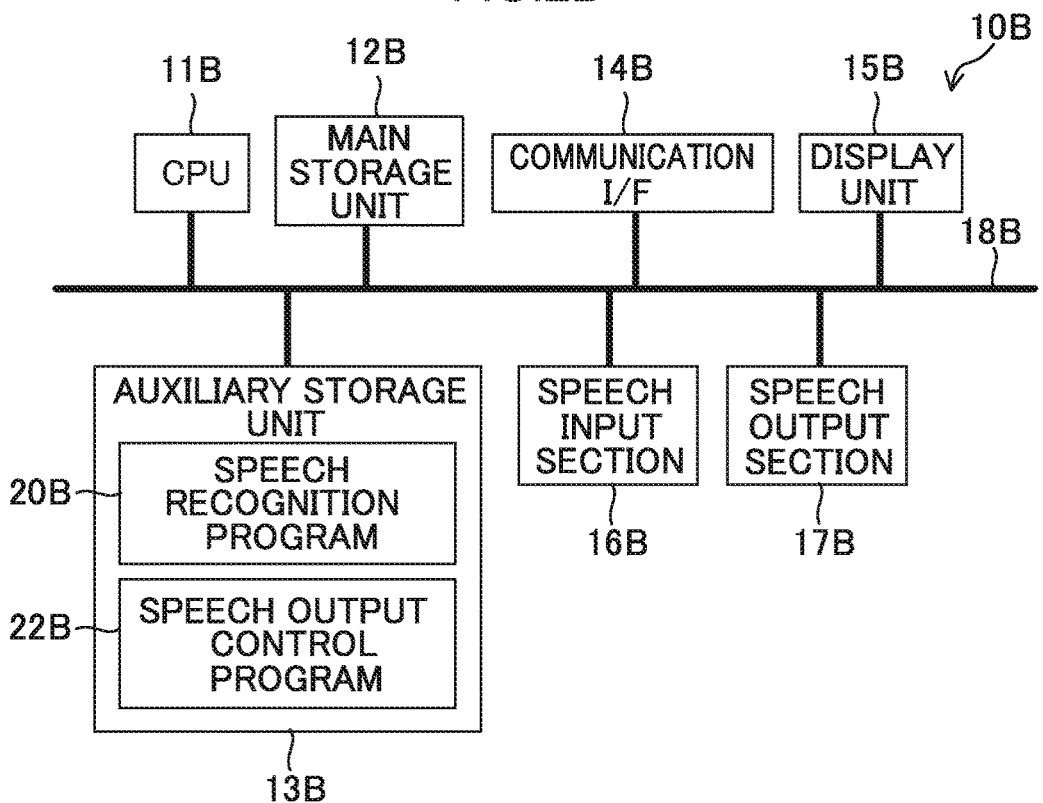

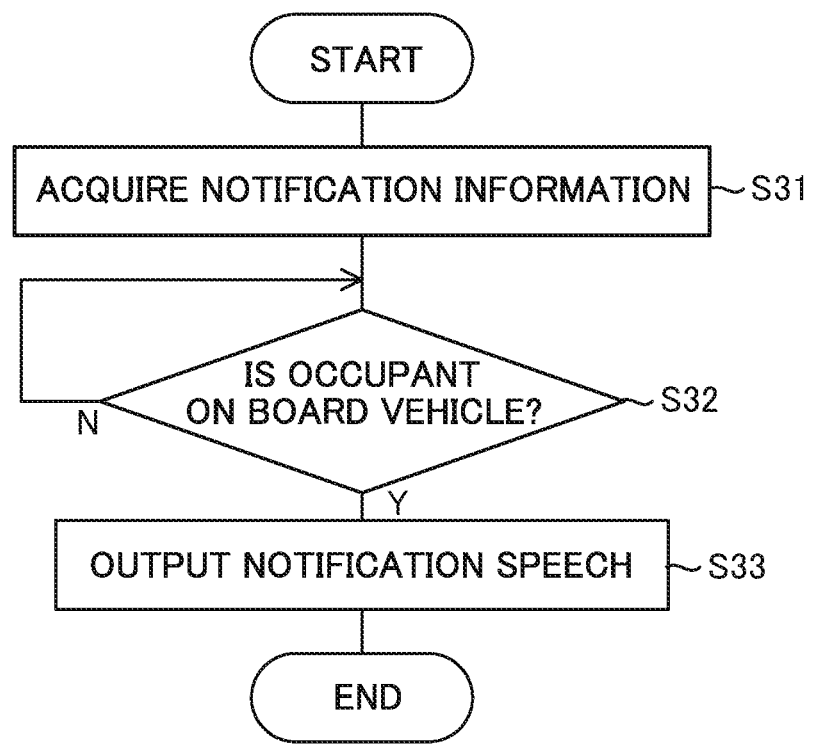

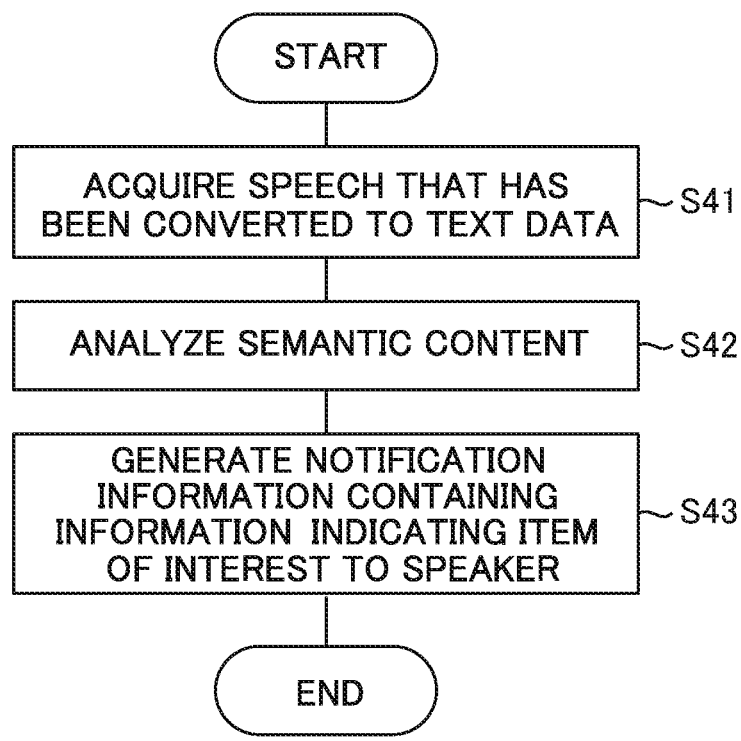
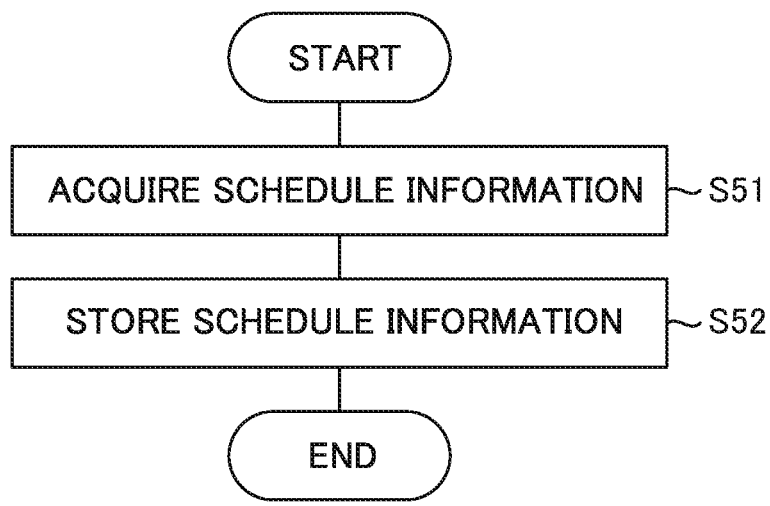

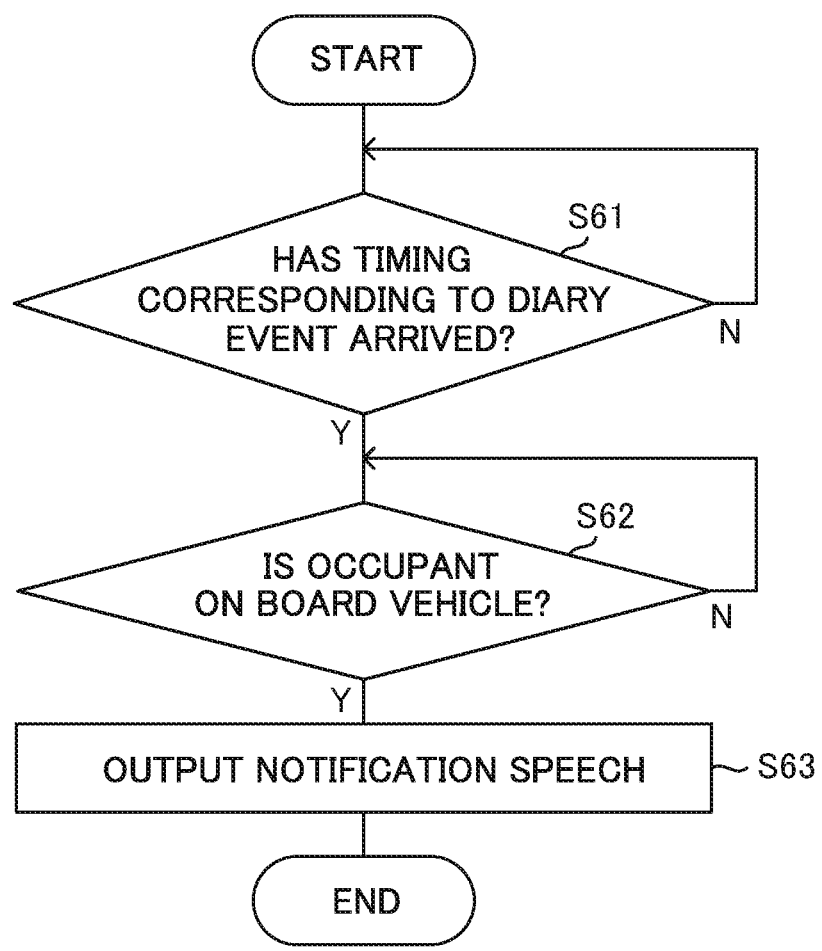

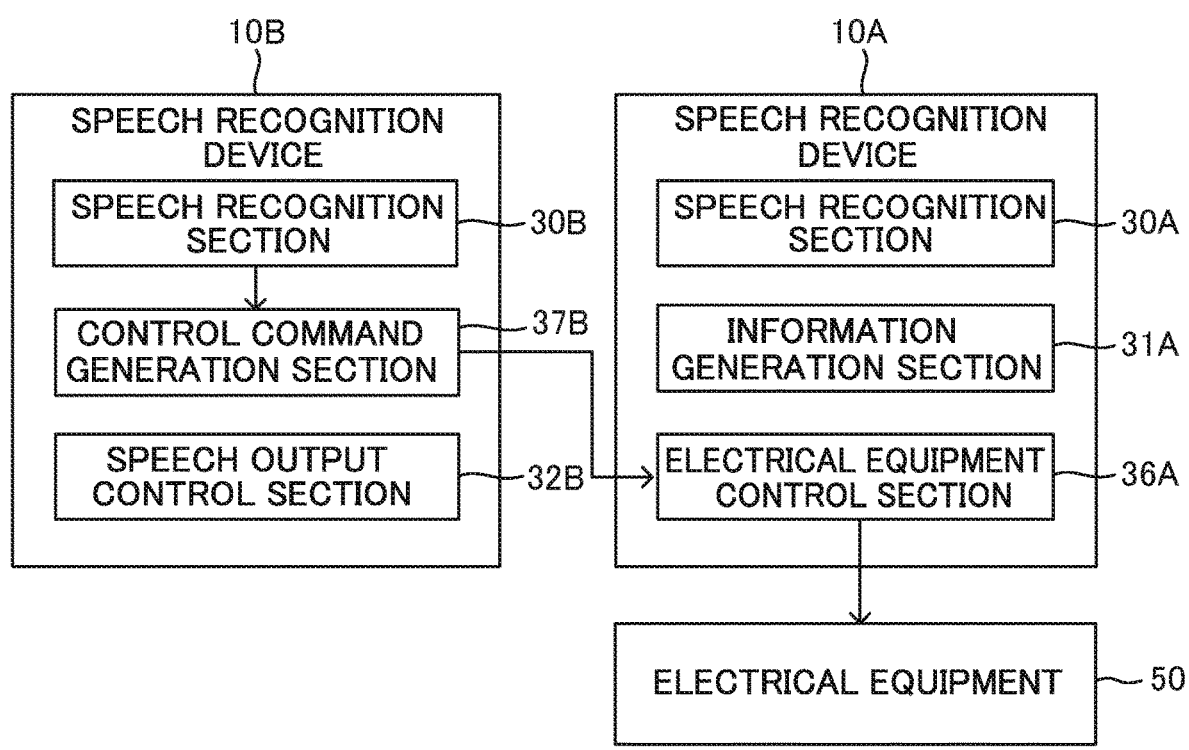

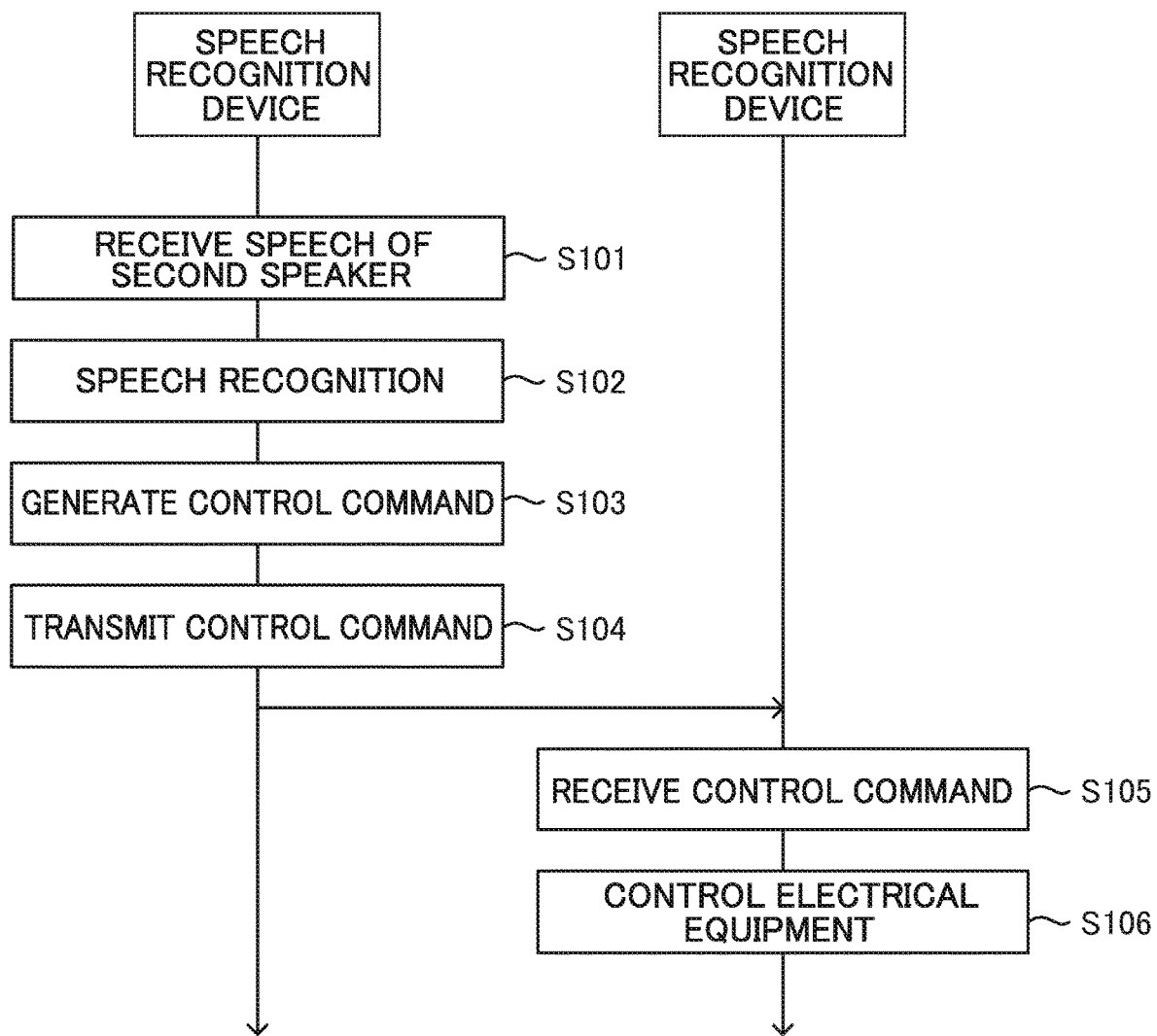

COMMUNICATION SYSTEM, COMMUNICATION METHOD, AND COMPUTER-READABLE STORAGE MEDIUM

CROSS-REFERENCE TO RELATED APPLICATION

This application is based on and claims priority under 35 USC 119 from Japanese Patent Application No. 2018-001783 filed Jan. 10, 2018, the disclosure of which is incorporated by reference herein in its entirely.

BACKGROUND

Technical Field

The present disclosure relates to a communication system, a communication method, and a computer-readable storage medium.

Related Art

Japanese Patent Application Laid-Open (JP-A) No. 2009-300537 (Patent Document 1) discloses a speech actuation system including a terminal device and an on-board device for communicating with the terminal device, whereby the on-board device is speech-actuated using the terminal device and the on-board device. In this speech actuation system, the terminal device includes a speech recognition section that recognizes speech, and a recognition result transmission section that transmits a recognition result of the speech recognition section. The on-board device includes an actuation control section that controls actuation of the device itself based on the recognition result transmitted by the recognition result transmission section of the terminal device.

Speech recognition devices such as artificial intelligence (AI) speakers are generally utilized to execute an application corresponding to recognized speech and to output an execution result as speech.

Utilizing two speech recognition devices to convey information between two people present in different locations may be considered as a way to enable smooth communication between the two people.

SUMMARY

In consideration of the above circumstances, an object of the present disclosure is to provide a communication system, a communication method, and a program enabling plural speech recognition devices to be utilized to convey information between two people present in different locations.

A communication system according to a first aspect includes a pair of speech recognition devices that are capable of communicating with each other, each of the speech recognition devices including a speech input section into which speech is input, a speech recognition section that recognizes speech input to the speech input section, and a speech output section that outputs speech. The communication system also includes an information generation section that generates notification information corresponding to speech recognized by the speech recognition section in one speech recognition device from out of the pair of speech recognition devices, and a speech output control section that performs control to output notification speech corresponding to the notification information at a specific timing from the speech output section of the other speech recognition device from out of the pair of speech recognition devices.

In the communication system according to the first aspect, the notification speech corresponding to the notification information generated corresponding to the speech recognized by the speech recognition section in the one speech recognition device is output at a specific timing from the speech output section of the other speech recognition device. Thus, the pair of speech recognition devices can be utilized to convey information between two people present at different locations.

In a communication system according to a second aspect, the speech output control section performs control to output the notification speech in cases in which an occupant is on board a vehicle installed with the other speech recognition device, or on board a vehicle into which the other speech recognition device has been brought.

In the communication system according to the second aspect, the notification speech corresponding to the notification information transmitted from the one speech recognition device is output in cases in which the occupant is on board the vehicle installed with the other speech recognition device, or on board the vehicle into which the other speech recognition device has been brought. This enables increased convenience in cases in which the other speech recognition device is utilized inside a vehicle.

A communication system according to a third aspect further includes a schedule information acquisition section that acquires schedule information. The speech output control section performs control to output the notification speech at a timing corresponding to a diary event indicated by schedule information acquired by the schedule information acquisition section.

In the communication system according to the third aspect, the notification speech is output by the other speech recognition device at a timing corresponding to a diary event indicated by schedule information. This enables the notification speech to be output at a suitable timing corresponding to a predetermined diary event.

In a communication system according to a fourth aspect, as the notification information, the information generation section generates a summary of speech content recognized by the speech recognition section of the one speech recognition device.

In the communication system according to the fourth aspect, a summary of speech content recognized by the speech recognition section of the one speech recognition device is generated as the notification information. This enables the information conveyed from the one speech recognition device to the other speech recognition device to be made concise.

In a communication system according to a fifth aspect, as the notification information, the information generation section generates information indicating an item of interest to a speaker who generated the speech, as inferred by speech content recognized by the speech recognition section of the one speech recognition device.

In the communication system according to the fifth aspect, the information indicating an item of interest to the speaker on the one speech recognition device side is generated as the notification information. This enables a speaker on the other speech recognition device side to be informed of an item of interest to the speaker on the one speech recognition device side.

A communication system according to a sixth aspect further includes a destination setting section that outputs inquiry speech inquiring whether route guidance to a particular location is needed, from the speech output section of the other speech recognition device based on the notification information. In cases in which a response to the inquiry speech as recognized by the speech recognition section of the other speech recognition device is a request for route guidance, the destination setting section sets the particular location as a destination of route guidance executed by a navigation device connected to the other speech recognition device.

In the communication system according to the sixth aspect, the inquiry speech inquiring whether route guidance to a particular location is needed is output from the speech output section of the other speech recognition device based on the notification information. In cases in which the response to the inquiry speech as recognized by the speech recognition section of the other speech recognition device is a request for route guidance, the particular location is set as the destination of route guidance executed by the navigation device connected to the other speech recognition device. This enables the destination of the navigation device connected to the other speech recognition device to be automatically set corresponding to the notification information transmitted from the one speech recognition device.

A communication system according to a seventh aspect further includes a start-up information notification section that, on detection of start-up of a vehicle installed with one speech recognition device from out of the pair of speech recognition devices, or of a vehicle into which one speech recognition device from out of the pair of speech recognition devices has been brought, notifies the other speech recognition device from out of the pair of speech recognition devices with start-up information indicating that the vehicle has been started up. The speech output section of the speech recognition device that, from out of the pair of speech recognition devices, has been notified with the start-up information outputs speech corresponding to the start-up information.

In the communication system according to the seventh aspect, the other speech recognition device is notified with the start-up information indicating that start-up has been detected for the vehicle installed with the one speech recognition device, or for the vehicle into which the one speech recognition device has been brought. The speech recognition device that has been notified with the start-up information outputs speech corresponding to the start-up information. This enables the speaker on the other speech recognition device side to be informed of the movements of the occupant of the vehicle.

A communication system according to an eighth aspect further includes an electrical equipment control section that, in cases in which speech recognized by the speech recognition section of one speech recognition device from out of the pair of speech recognition devices contains an operation instruction regarding electrical equipment connected to the other speech recognition device from out of the pair of speech recognition devices, controls the electrical equipment based on the operation instruction.

In the communication system according to the eighth aspect, the electrical equipment connected to the other speech recognition device is controlled based on the operation instruction contained in the speech recognized by the speech recognition section of the one speech recognition device. This enables the electrical equipment to be operated remotely.

A program according to a ninth aspect causes a computer to function as the speech output control section of the communication system of any one of the first to the eight aspects.

In the program according to the ninth aspect, the notification speech corresponding to the notification information generated corresponding to the speech recognized by the speech recognition section of the one speech recognition device is output at a specific timing from the speech output section of the other speech recognition device.

A communication method according to a tenth aspect is a communication method of a communication system including a pair of speech recognition devices that are capable of communicating with each other and that each include a speech input section into which speech is input, a speech recognition section that recognizes speech input to the speech input section, and a speech output section that outputs speech. The communication method includes generating notification information corresponding to speech recognized by the speech recognition section of one speech recognition device from out of the pair of speech recognition devices, and outputting notification speech corresponding to the notification information at a specific timing from the speech output section of the other speech recognition device from out of the pair of speech recognition devices.

In the communication method according to the tenth aspect, the notification speech corresponding to the notification information generated corresponding to the speech recognized by the speech recognition section of the one speech recognition device is output at a specific timing from the speech output section of the other speech recognition device. Thus, the pair of speech recognition devices can be utilized to convey information between two people present at different locations.

The present disclosure provides a communication system, a communication method, and a computer-readable storage medium storing a program enabling plural speech recognition devices to be utilized to convey information between two people present at different locations.

BRIEF DESCRIPTION OF THE DRAWINGS

Exemplary embodiments of the present disclosure will be described in detail based on the following figures, wherein:

FIG. 2A is a diagram illustrating an example of a hardware configuration of a speech recognition device according to a first exemplary embodiment of the present disclosure;

FIG. 2B is a diagram illustrating an example of a hardware configuration of a speech recognition device according to the first exemplary embodiment of the present disclosure;

FIG. 7 is a diagram illustrating an example of a flow of speech output control processing executed by a speech output control section according to the first exemplary embodiment of the present disclosure;

FIG. 10 is a flowchart illustrating an example of a flow of information generation processing executed by an information generation section according to the second exemplary embodiment of the present disclosure;

FIG. 11 is a flowchart illustrating an example of a flow of schedule information acquisition processing executed by a schedule information acquisition section according to the second exemplary embodiment of the present disclosure;

FIG. 12 is a diagram illustrating an example of a flow of speech output control processing executed by a speech output control section according to the second exemplary embodiment of the present disclosure;

FIG. 21 is a functional block diagram illustrating functional configuration of the speech recognition devices according to the fifth exemplary embodiment of the present disclosure;

FIG. 22 is a sequence diagram illustrating an example of a flow of processing executed by speech recognition devices according to the fifth exemplary embodiment of the present disclosure;

DETAILED DESCRIPTION

Figure 1:
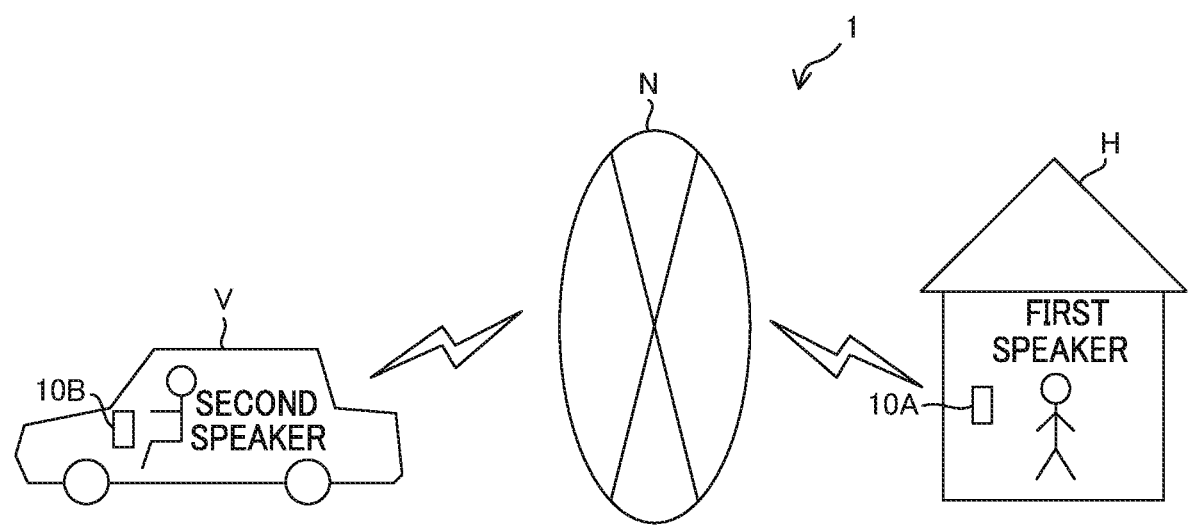
FIG. 1 is a diagram illustrating an example of configuration of a communication system according to an exemplary embodiment of the present disclosure.

Explanation follows regarding examples of exemplary embodiments of the present disclosure, with reference to the drawings. Note that the same reference numerals are appended to the same or equivalent configuration elements and sections in each of the drawings.

First Exemplary Embodiment

FIG. 1 is a diagram illustrating an example of configuration of a communication system 1 according to an exemplary embodiment of the present disclosure. The communication system 1 is configured including a pair of speech recognition devices 10A and 10B that are connected so as to be capable of communicating with each other via a network N. In the below explanation, the speech recognition device 10A is installed in a house H where a first speaker is present, and the speech recognition device 10B is installed in a vehicle V, on board which is a second speaker. Note that the speech recognition devices 10A and 10B may each be configured as a portable device, with the speech recognition device 10A being carried into the house H by the first speaker and the speech recognition device 10B carried into the vehicle V by the second speaker. The installation locations of the speech recognition devices 10A and 10B are not limited to the above examples, and the speech recognition devices 10A and 10B may be installed in or carried to any desired location.

FIG. 2A is a diagram illustrating an example of a hardware configuration of the speech recognition device 10A. The speech recognition device 10A is configured including a computer. Namely, the speech recognition device 10A includes a Central Processing Unit (CPU) 11A, a main storage unit 12A serving as a temporary storage region, and a non-volatile auxiliary storage unit 13A. The speech recognition device 10A also includes a communication interface (I/F) 14A employed when communicating with external devices, including the speech recognition device 10B, via the network N, a display unit 15A such as a liquid crystal display, a speech input section 16A such as a microphone through which speech is input, and a speech output section 17A such as a speaker from which speech is output. The CPU 11A, the main storage unit 12A, the auxiliary storage unit 13A, the communication I/F 14A, the display unit 15A, the speech input section 16A, and the speech output section 17A are connected to each other through a bus 18A. A speech recognition program 20A and an information generation program 21A are stored in the auxiliary storage unit 13A.

FIG. 2B is a diagram illustrating an example of a hardware configuration of the speech recognition device 10B. The speech recognition device 10B has a similar configuration to the speech recognition device 10A, and is configured including a computer. Namely, the speech recognition device 10B includes a CPU 11B, a main storage unit 12B, an auxiliary storage unit 13B, a communication I/F 14B, a display unit 15B, a speech input section 16B, and a speech output section 17B. The CPU 11B, the main storage unit 12B, the auxiliary storage unit 13B, the communication I/F 14B, the display unit 15B, the speech input section 16B, and the speech output section 17B are connected to each other through a bus 18B. A speech recognition program 20B and a speech output control program 22B are stored in the auxiliary storage unit 13B. Note that AI speakers are examples of the speech recognition devices 10A and 10B.

Figure 3:
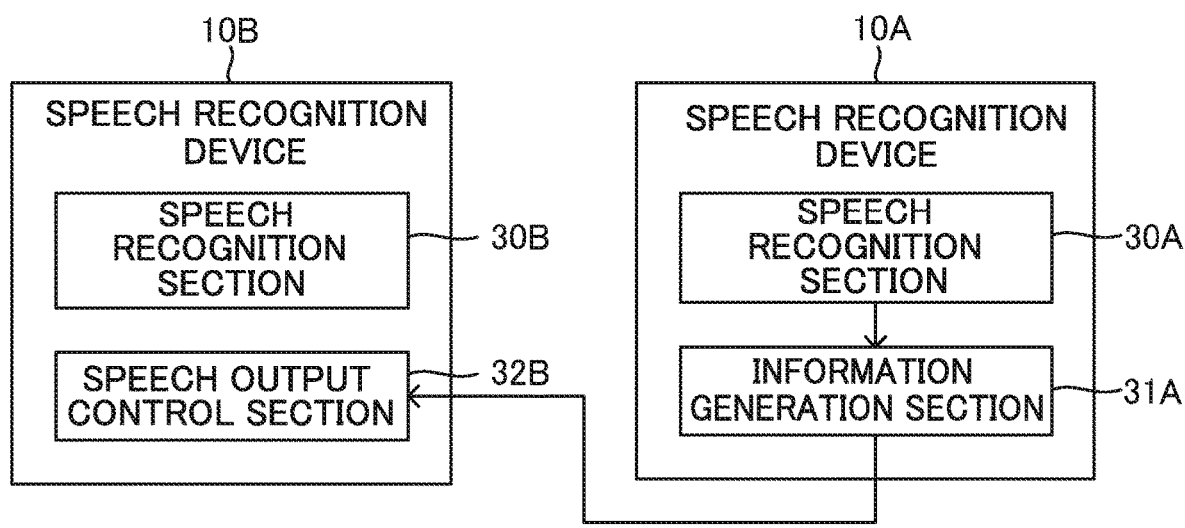
FIG. 3 is a functional block diagram illustrating a functional configuration of speech recognition devices according to the first exemplary embodiment of the present disclosure.

FIG. 3 is a functional block diagram illustrating a functional configuration of the speech recognition devices 10A and 10B. The speech recognition device 10A includes a speech recognition section 30A and an information generation section 31A. The speech recognition device 10B includes a speech recognition section 30B and a speech output control section 32B.

The CPU 11A of the speech recognition device 10A functions as the speech recognition section 30A by executing the speech recognition program 20A, and functions as the information generation section 31A by executing the information generation program 21A. The CPU 11B of the speech recognition device 10B functions as the speech recognition section 30B by executing the speech recognition program 20B, and functions as the speech output control section 32B by executing the speech output control program 22B.

The speech recognition section 30A recognizes speech uttered by the first speaker input to the speech input section 16A, and converts the speech to text data. Speech recognition by the speech recognition section 30A may be realized by known speech recognition technology employing, for example, an acoustic model, dictionaries, and a language model.

The information generation section 31A comprehends the semantic content of the speech (that has been converted to text data) recognized by the speech recognition section 30A, then generates notification information corresponding to the recognized speech. In the present exemplary embodiment, the information generation section 31A generates a summary of the content of the recognized speech as the notification information. For example, the information generation section 31A comprehends the semantic content of the speech that has been converted to text data by performing morpheme analysis, phrase analysis, syntax analysis, and semantic analysis on the speech, removes unnecessary words contained in the speech, and as the notification information, generates more concise speech information that has the same semantic content as the comprehended semantic content. Generation of notification information by the information generation section 31A may be realized using known text mining technology or the like.

The speech recognition section 30B recognizes speech uttered by the second speaker that is input to the speech input section 16B, and converts the speech to text data. Speech recognition by the speech recognition section 30B may be realized by known speech recognition technology employing, for example; an acoustic model, dictionaries, and a language model.

The speech output control section 32B performs control to output the notification information transmitted from the speech recognition device 10A from the speech output section 17B of the speech recognition device 10B at a specific timing. In cases in which the second speaker is on board the vehicle V in which they are traveling, the speech output control section 32B outputs notification speech corresponding to the notification information transmitted from the speech recognition device 10A.

Figure 4:
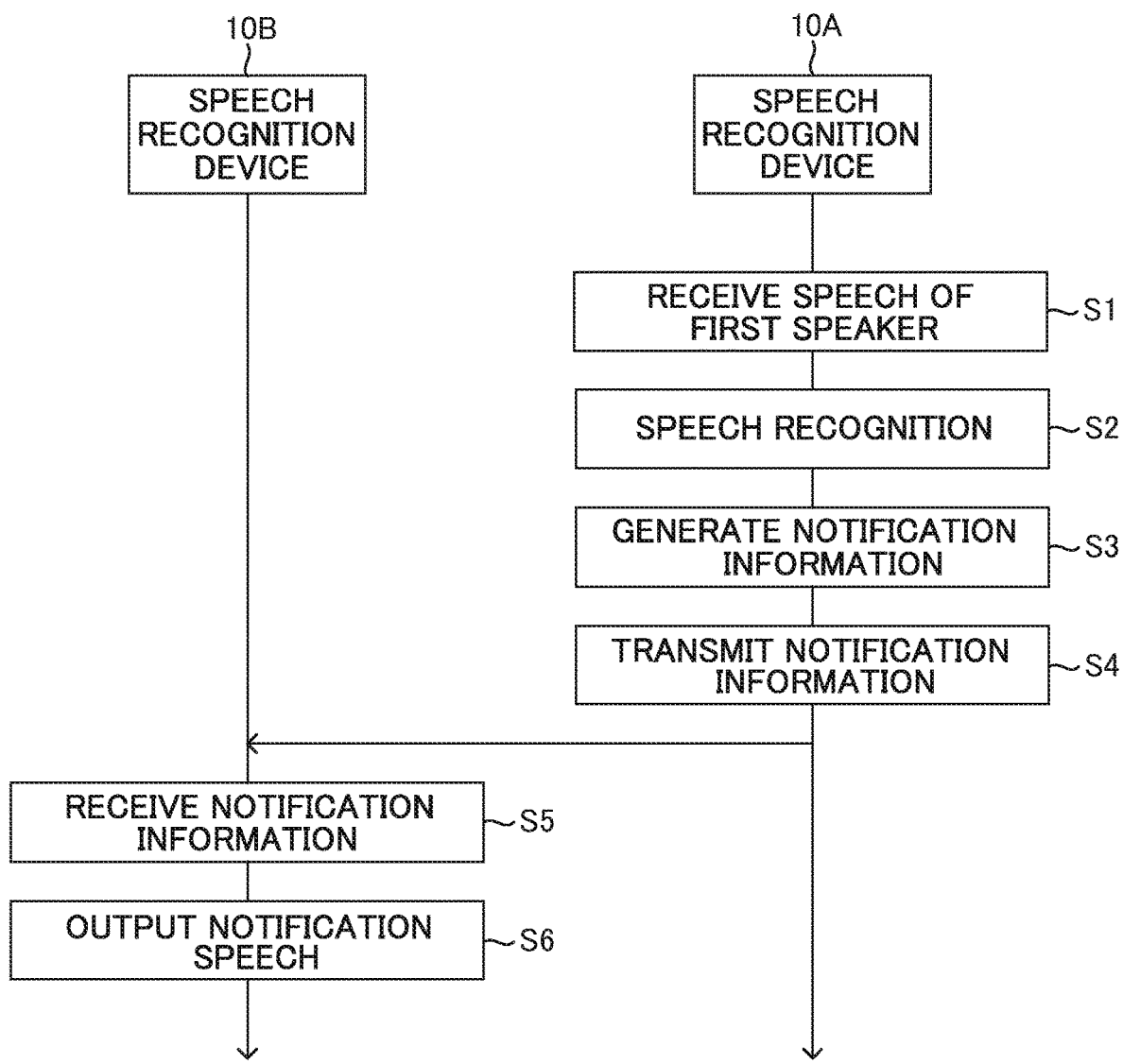
FIG. 4 is a sequence chart illustrating an example of a flow of processing executed by speech recognition devices according to the first exemplary embodiment of the present disclosure.

Explanation follows regarding operation of the communication system 1 according to the present exemplary embodiment. FIG. 4 is a sequence chart illustrating an example of a flow of processing executed by the speech recognition devices 10A and 10B.

At step S1, the speech input section 16A of the speech recognition device 10A receives input of speech uttered by the first speaker.

When speech has been input to the speech input section 16A of the speech recognition device 10A, at step S2, the CPU 11A of the speech recognition device 10A functions as the speech recognition section 30A by executing the speech recognition program 20A to recognize the input speech.

Figure 5:
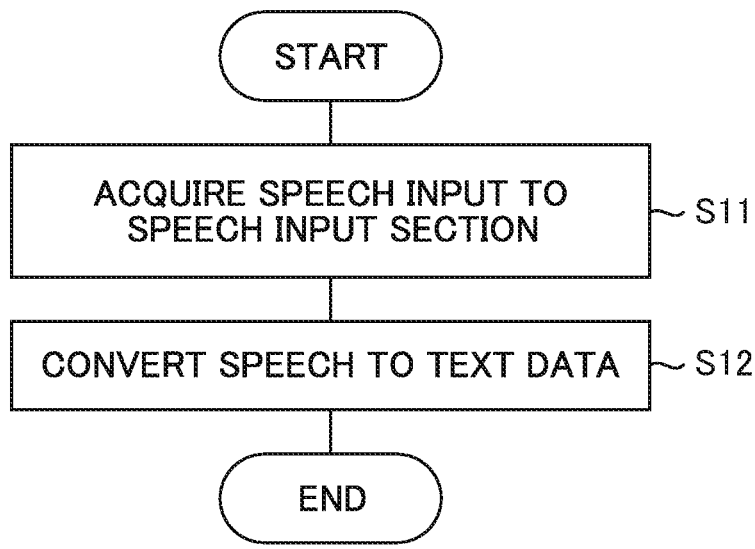
FIG. 5 is a flowchart illustrating an example of a flow of speech recognition processing executed by a speech recognition section according to the first exemplary embodiment of the present disclosure.

FIG. 5 is a flowchart illustrating an example of a flow of speech recognition processing executed by the speech recognition section 30A. At step S11, the CPU 11A functions as the speech recognition section 30A, and acquires the speech that has been input to the speech input section 16A. At step S12, the CPU 11A recognizes the acquired speech by converting the speech to text data using known speech recognition technology utilizing an acoustic model, dictionaries, and a language model.

At step S3, the CPU 11A of the speech recognition device 10A functions as the information generation section 31A by executing the information generation program 21A to generate notification information corresponding to the speech recognized by the speech recognition section 30A.

Figure 6:
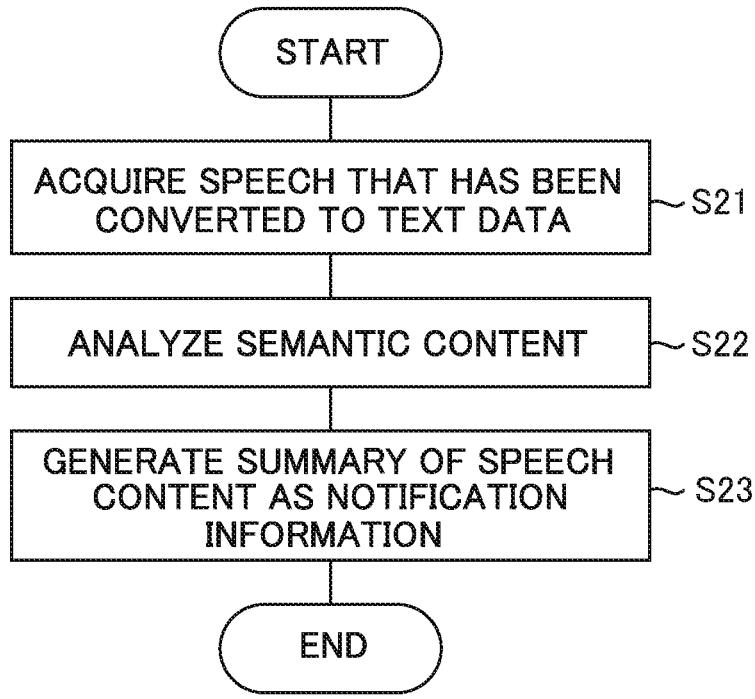
FIG. 6 is a flowchart illustrating an example of a flow of information generation processing executed by an information generation section according to the first exemplary embodiment of the present disclosure.

FIG. 6 is a flowchart illustrating an example of a flow of information generation processing executed by the information generation section 31A. At step S21, the CPU 11A functions as the information generation section 31A to acquire the speech that has been converted to text data by the speech recognition section 30A. At step S22, the CPU 11A comprehends the semantic content of the speech that has been converted to text data by performing known morpheme analysis, phrase analysis, syntax analysis, and semantic analysis on the speech. At step S23, the CPU 11A removes unnecessary words contained in the speech, and as the notification information, generates more concise speech information that has the same semantic content as the comprehended semantic content. Namely, in the present exemplary embodiment, the information generation section 31A generates a summary of the speech content recognized by the speech recognition section 30A as the notification information.

At step S4, the CPU 11A of the speech recognition device 10A transmits the generated notification information to the speech recognition device 10B via the communication I/F 14A.

At step S5, the CPU 11B of the speech recognition device 10B receives the notification information transmitted from the speech recognition device 10A via the communication I/F 14B.

At step S6, the CPU 11B of the speech recognition device 10B functions as the speech output control section 32B by executing the speech output control program 22B, and performs control to output notification speech corresponding to the notification information transmitted from the speech recognition device 10A from the speech output section 17B at a specific timing.

FIG. 7 is a diagram illustrating an example of a flow of speech output control processing executed by the speech output control section 32B. At step S31, the CPU 11B functions as the speech output control section 32B to acquire notification information transmitted from the speech recognition device 10A. At step S32, the CPU 11B determines whether or not an occupant is on board the vehicle V. For example, the CPU 11B may determine that the occupant is on board the vehicle V in cases in which information indicating that an accessory power source of the vehicle V is in an ON state has been acquired from an Electronic Control Unit (ECU) connected to the CPU 11B so as to be capable of wired or wireless communication therewith. Alternatively, the CPU 11B may determine that an occupant is on board the vehicle V in cases in which information indicating that the engine of the vehicle V is running has been acquired from the ECU connected to the CPU 11B so as to be capable of wired or wireless communication therewith. Alternatively, if the speech recognition device 10B is configured by a portable device, the CPU 11B may determine that the occupant is on board the vehicle V in cases in which the speech recognition device 10B has established a wired or wireless communication connection with the ECU of the vehicle V. In cases in which the CPU 11B has determined that the occupant is on board the vehicle V, at step S33, the CPU 11B outputs the notification speech corresponding to the notification information transmitted from the speech recognition device 10A from the speech output section 17B.

In the communication system 1 according to the present exemplary embodiment, information can be conveyed from the first speaker (for example a wife) at home in the house H to the second speaker (for example a husband) on board the vehicle V. Thus, for example, the communication system 1 according to the present exemplary embodiment can be utilized by the first speaker (the wife) to request something of the second speaker (the husband). For example, if the first speaker (the wife) speaks to the speech recognition device 10A installed in the house H with content to request the second speaker (the husband) to buy something, notification information containing a summary of the speech content of the first speaker (the wife) is generated and transmitted to the speech recognition device 10B via the network N. The speech recognition device 10B installed in the vehicle V outputs notification speech corresponding to the notification information, for example "Please buy (product name)", from the speech output section 17B at a timing at which the second speaker (the husband) is on board the vehicle V.

Thus, in the communication system 1 according to the present exemplary embodiment, the speech recognition devices 10A and 10B may be utilized to convey information between two people present at different locations.

Note that in the above exemplary embodiment, an example is given in which the speech output control section 32B outputs notification speech in cases in which the occupant is on board the vehicle V; however, the present disclosure is not limited thereto. For example, the speech output control section 32B may output notification speech from the speech output section 17B in cases in which the speech recognition device 10B has been activated.

In the above exemplary embodiment, an example is given in which the information generation section 31A is provided to the speech recognition device 10A, and the speech output control section 32B is provided to the speech recognition device 10B. However, the information generation section 31A and the speech output control section 32B may be provided to a server (not illustrated in the drawings) connected to the network N.

Functional sections corresponding to the information generation section 31A and the speech output control section 32B may be installed to both the speech recognition devices 10A and 10B. This enables notification information to be generated based on the speech input to the speech input section 16B of the speech recognition device 10B installed in the vehicle V, and this notification information to be output from the speech output section 17A of the speech recognition device 10A installed in the house H.

Second Exemplary Embodiment

Figure 8A:
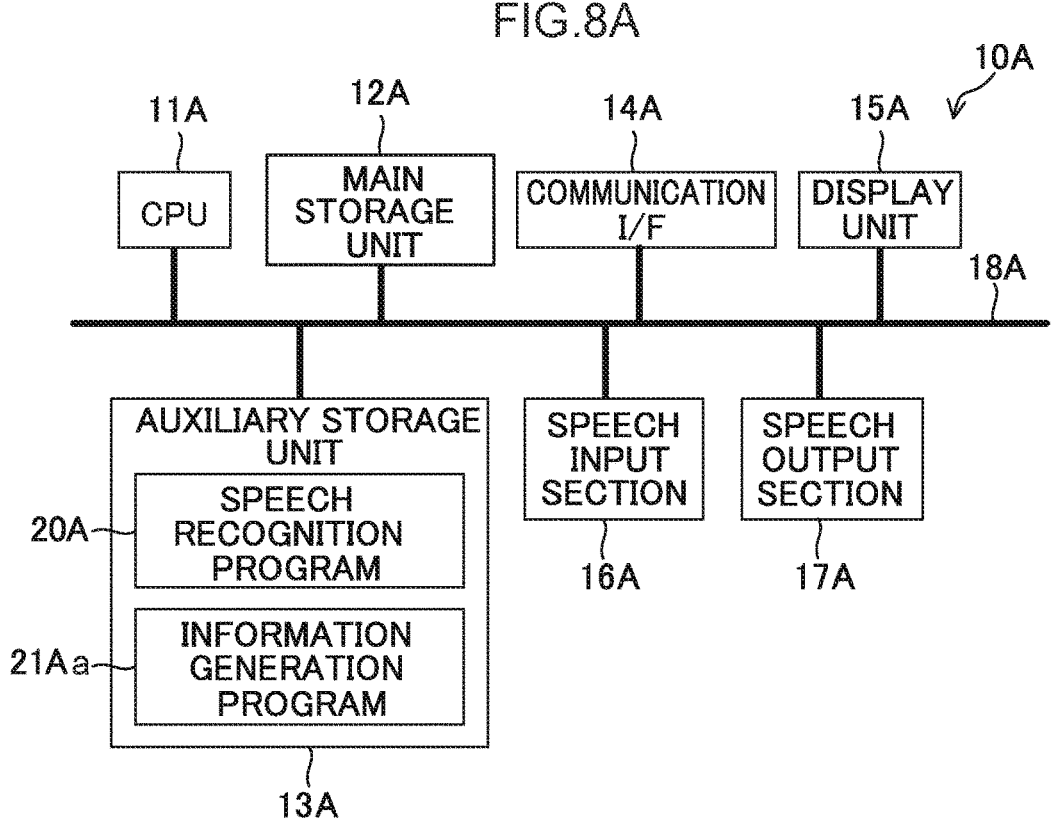
FIG. 8A is a diagram illustrating an example of a hardware configuration of a speech recognition device according to a second exemplary embodiment of the present disclosure.

FIG. 8A is a diagram illustrating an example of a hardware configuration of a speech recognition device 10A according to a second exemplary embodiment of the present disclosure. The speech recognition device 10A differs from the speech recognition device 10A according to the first exemplary embodiment (see FIG. 2A) in the respect that it includes an information generation program 21Aa stored in the auxiliary storage unit 13A.

Figure 8B:
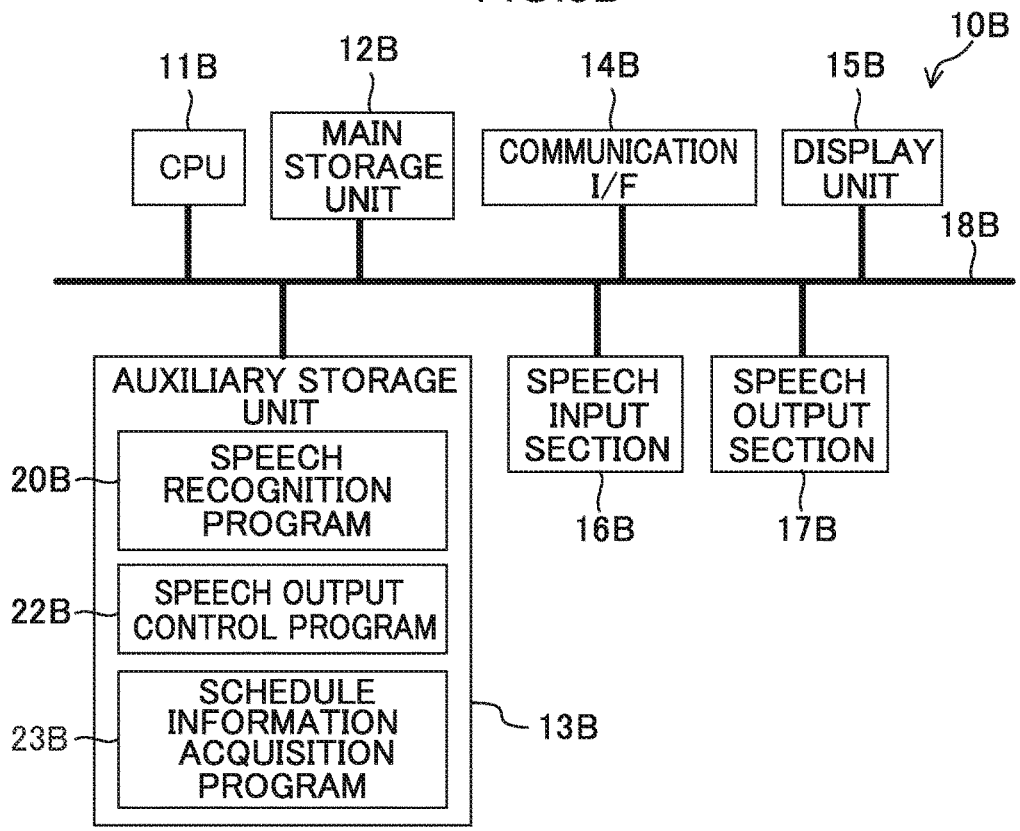
FIG. 8B is a diagram illustrating an example of a hardware configuration of a speech recognition device according to the second exemplary embodiment of the present disclosure.

FIG. 8B is a diagram illustrating an example of a hardware configuration of a speech recognition device 10B according to the second exemplary embodiment of the present disclosure. The speech recognition device 10B differs from the speech recognition device 10B according to the first exemplary embodiment (see FIG. 2B) in the respect that it further includes a schedule information acquisition program 23B stored in the auxiliary storage unit 13B.

Figure 9:
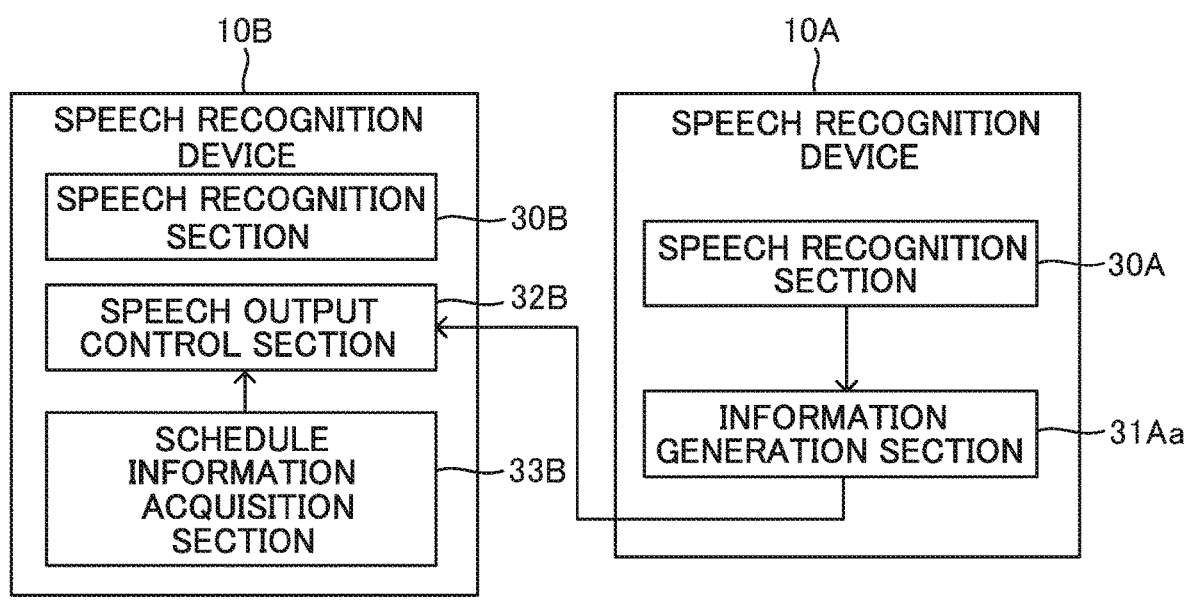
FIG. 9 is a functional block diagram illustrating functional configuration of speech recognition devices according to the second exemplary embodiment of the present disclosure.

FIG. 9 is a functional block diagram illustrating functional configuration of the speech recognition devices 10A and 10B according to the second exemplary embodiment of the present disclosure. The speech recognition device 10A includes the speech recognition section 30A and an information generation section 31Aa. The speech recognition device 10B includes the speech recognition section 30B, the speech output control section 32B, and a schedule information acquisition section 33B.

The CPU 11A of the speech recognition device 10A functions as the information generation section 31Aa by executing the information generation program 21Aa. The CPU 11B of the speech recognition device 10B functions as the schedule information acquisition section 33B by executing the schedule information acquisition program 23B.

The information generation section 31Aa comprehends the semantic content of speech (that has been converted to text data) recognized by the speech recognition section 30A, then generates notification information corresponding to the recognized speech. In the present exemplary embodiment, as the notification information, the information generation section 31Aa generates information indicating an item of interest to the first speaker, as inferred from recognized speech content. Generation of notification information by the information generation section 31Aa may be realized using known text mining technology or the like.

The schedule information acquisition section 33B acquires schedule information indicating diary events such as a birthday or a wedding anniversary. For example, the schedule information acquisition section 33B may acquire schedule information by importing schedule information from a smartphone in which diary events have already been registered. Alternatively, the schedule information acquisition section 33B may acquire schedule information from speech input to the speech input section 16B. Alternatively, the schedule information acquisition section 33B may acquire schedule information from notification information transmitted from the speech recognition device 10A. The schedule information acquisition section 33B stores the acquired schedule information in the auxiliary storage unit 13B.

In the present exemplary embodiment, the speech output control section 32B outputs notification information transmitted from the speech recognition device 10A at a timing corresponding to a diary event indicated by the schedule information acquired by the schedule information acquisition section 33B.

Explanation follows regarding operation of the communication system 1 according to the present exemplary embodiment, with reference to the sequence chart illustrated in FIG. 4.

At step S1, the speech input section 16A of the speech recognition device 10A receives input of speech uttered by the first speaker.

When speech has been input to the speech input section 16A of the speech recognition device 10A, at step S2, the CPU 11A of the speech recognition device 10A functions as the speech recognition section 30A by executing the speech recognition program 20A to recognize the input speech.

At step S3, the CPU 11A of the speech recognition device 10A functions as the information generation section 31Aa by executing the information generation program 21Aa to generate notification information corresponding to the speech recognized by the speech recognition section 30A.

FIG. 10 is a flowchart illustrating an example of a flow of information generation processing executed by the information generation section 31Aa. At step S41, the CPU 11A functions as the information generation section 31Aa to acquire the speech that has been converted to text data by the speech recognition section 30A. At step S42, the CPU 11A comprehends the semantic content of the speech that has been converted to text data by performing morpheme analysis, phrase analysis, syntax analysis, and semantic analysis on the speech. At step S43, the CPU 11A infers an item of interest to the first speaker from the speech, and generates information indicating the inferred item of interest as the notification information. For example, the information generation section 31Aa extracts the name of a product deduced as being of interest to the first speaker, based on the everyday conversation and comments of the first speaker that have been input to the speech input section 16A, as an item of interest to the first speaker. The information generation section 31Aa then generates information indicating the extracted item of interest as the notification information.

At step S4, the CPU 11A of the speech recognition device 10A transmits the generated notification information to the speech recognition device 10B via the communication I/F 14A.

At step S5, the CPU 11B of the speech recognition device 10B receives the notification information transmitted from the speech recognition device 10A via the communication I/F 14B.

At step S6, the CPU 11B of the speech recognition device 10B functions as the speech output control section 32B by executing the speech output control program 22B, and performs control to output notification speech corresponding to the notification information transmitted from the speech recognition device 10A from the speech output section 17B at a specific timing. In the present exemplary embodiment, the speech output control section 32B performs control to output the notification speech at a timing corresponding to a diary event indicated by the schedule information already acquired by the schedule information acquisition section 33B.

FIG. 11 is a flowchart illustrating an example of a flow of schedule information acquisition processing executed by the schedule information acquisition section 33B. At step S51, the CPU 11B functions as the schedule information acquisition section 33B to acquire schedule information. For example, the schedule information acquisition section 33B may acquire schedule information by importing schedule information from a smartphone in which diary events have already been registered. Alternatively, the schedule information acquisition section 33B may acquire schedule information from speech that has been input to the speech input section 16B. Alternatively, the schedule information acquisition section 33B may acquire schedule information from notification information transmitted from the speech recognition device 10A. At step S52, the CPU 11B stores the acquired schedule information in the auxiliary storage unit 13B.

FIG. 12 is a diagram illustrating an example of a flow of speech output control processing executed by the speech output control section 32B. At step S61, the CPU 11B functions as the speech output control section 32B to determine whether or not a timing corresponding to a diary event indicated by the schedule information acquired by the schedule information acquisition section 33B and stored in the auxiliary storage unit 13B has arrived. For example, the speech output control section 32B determines whether or not a day equivalent to one week before the birthday of the first speaker, as indicated by the schedule information, has arrived.

On determining that a timing corresponding to a diary event indicated by the schedule information has arrived, at step S62, the CPU 11B determines whether or not the occupant is on board the vehicle V. In cases in which the CPU 11B has determined both that the timing corresponding to the diary event indicated by the schedule information has arrived and that the occupant is on board the vehicle V, at step S63, the CPU 11B outputs notification speech, corresponding to notification information containing information indicating an item of interest to the first speaker transmitted from the speech recognition device 10A, from the speech output section 17B.

The communication system 1 according to the present exemplary embodiment enables the second speaker (for example a husband) who is on board the vehicle V to be informed of an item of interest to the first speaker (for example a wife) at home in the house H. Moreover, the second speaker can be notified of the item of interest to the first speaker at a timing corresponding to a diary event indicated by the schedule information, which has been acquired in advance. Thus, for example, the communication system 1 according to the present exemplary embodiment can be utilized to encourage the second speaker (the husband) to purchase a present that would please the first speaker (the wife) by informing the second speaker (the husband) of an item of interest to the first speaker (the wife) (such as the name of a product that the first speaker has shown interest in) one week before the birthday of the first speaker (the wife). For example, notification speech such as "It's nearly (name of first speaker)'s birthday. How about buying (name of product) as a present?" is output from the speech output section 17B of the speech recognition device 10B at a timing one week before the birthday of the first speaker (the wife) and when the second speaker (the husband) is on board the vehicle.

Note that in the above exemplary embodiment, an example is given in which the information generation section 31Aa is provided to the speech recognition device 10A, and the speech output control section 32B and the schedule information acquisition section 33B are provided to the speech recognition device 10B. However, the information generation section 31Aa, the speech output control section 32B, and the schedule information acquisition section 33B may be provided to a server (not illustrated in the drawings) connected to the network N.

Functional sections corresponding to the information generation section 31Aa, the speech output control section 32B, and the schedule information acquisition section 33B may be installed in both the speech recognition devices 10A and 10B. This enables notification information containing information indicating an item of interest to the second speaker to be generated based on speech input to the speech input section 16B of the speech recognition device 10B, and this notification information to be output from the speech output section 17A of the speech recognition device 10A at a timing corresponding to a diary event indicated by the schedule information.

Third Exemplary Embodiment

Figure 13:
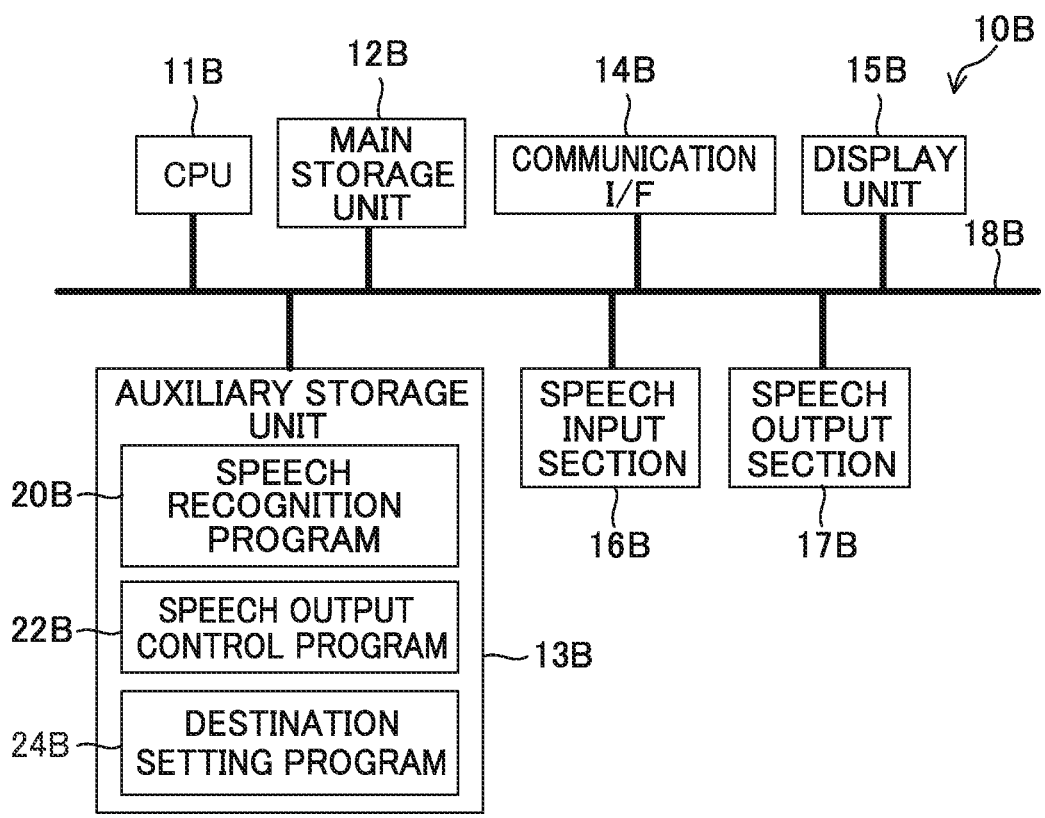
FIG. 13 is a diagram illustrating an example of a hardware configuration of a speech recognition device according to a third exemplary embodiment of the present disclosure.

FIG. 13 is a diagram illustrating an example of a hardware configuration of a speech recognition device 10B according to a third exemplary embodiment of the present disclosure. The speech recognition device 10B according to the present exemplary embodiment differs from the speech recognition device 10B according to the first exemplary embodiment (see FIG. 2B) in the respect that it further includes a destination setting program 24B stored in the auxiliary storage unit 13B.

Figure 14:
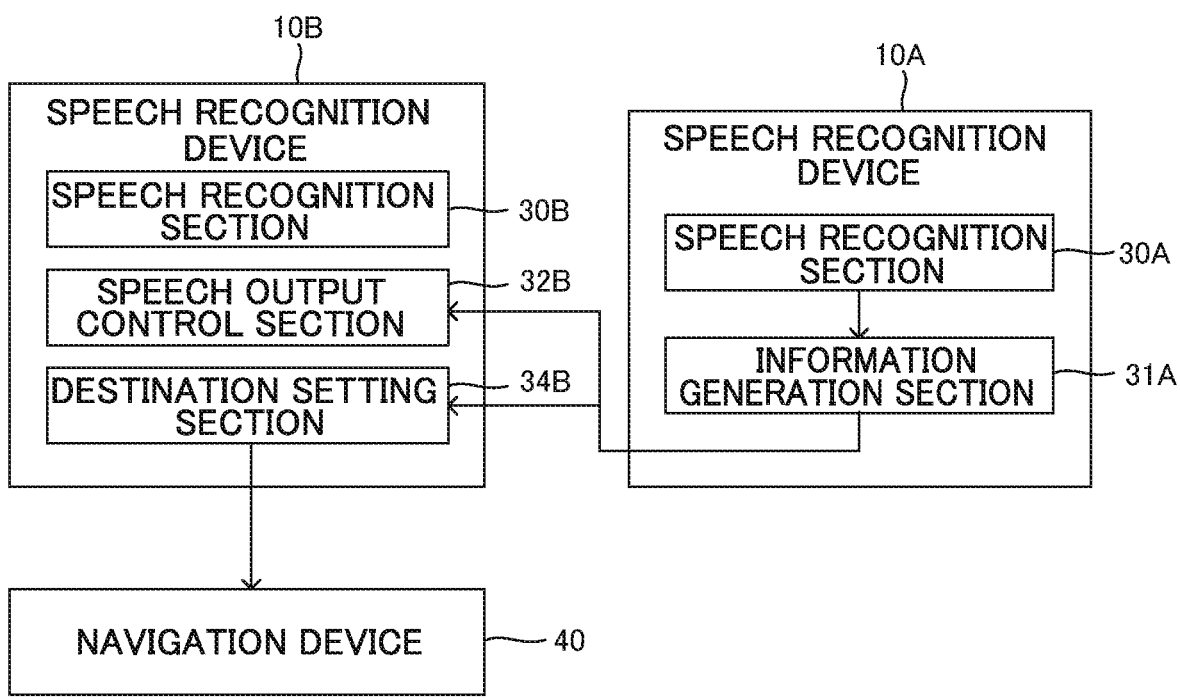
FIG. 14 is a functional block diagram illustrating functional configuration of speech recognition devices according to the third exemplary embodiment of the present disclosure.

FIG. 14 is a functional block diagram illustrating functional configuration of the speech recognition devices 10A and 10B according to the third exemplary embodiment of the present disclosure. The speech recognition device 10A includes the speech recognition section 30A and the information generation section 31A. The speech recognition device 10B includes the speech recognition section 30B, the speech output control section 32B, and a destination setting section 34B. The CPU 11B of the speech recognition device 10B functions as the destination setting section 34B by executing the destination setting program 24B.

Based on the notification information transmitted from the speech recognition device 10A, the destination setting section 34B outputs inquiry speech from the speech output section 17B of the speech recognition device 10B to inquire whether route guidance to a particular location is required. In cases in which a response to the inquiry speech, input to the speech input section 16B of the speech recognition device 10B, is that route guidance is required, the destination setting section 34B sets the particular location as the destination of route guidance executed by a navigation device 40 connected to the speech recognition device 10B.

Figure 15:
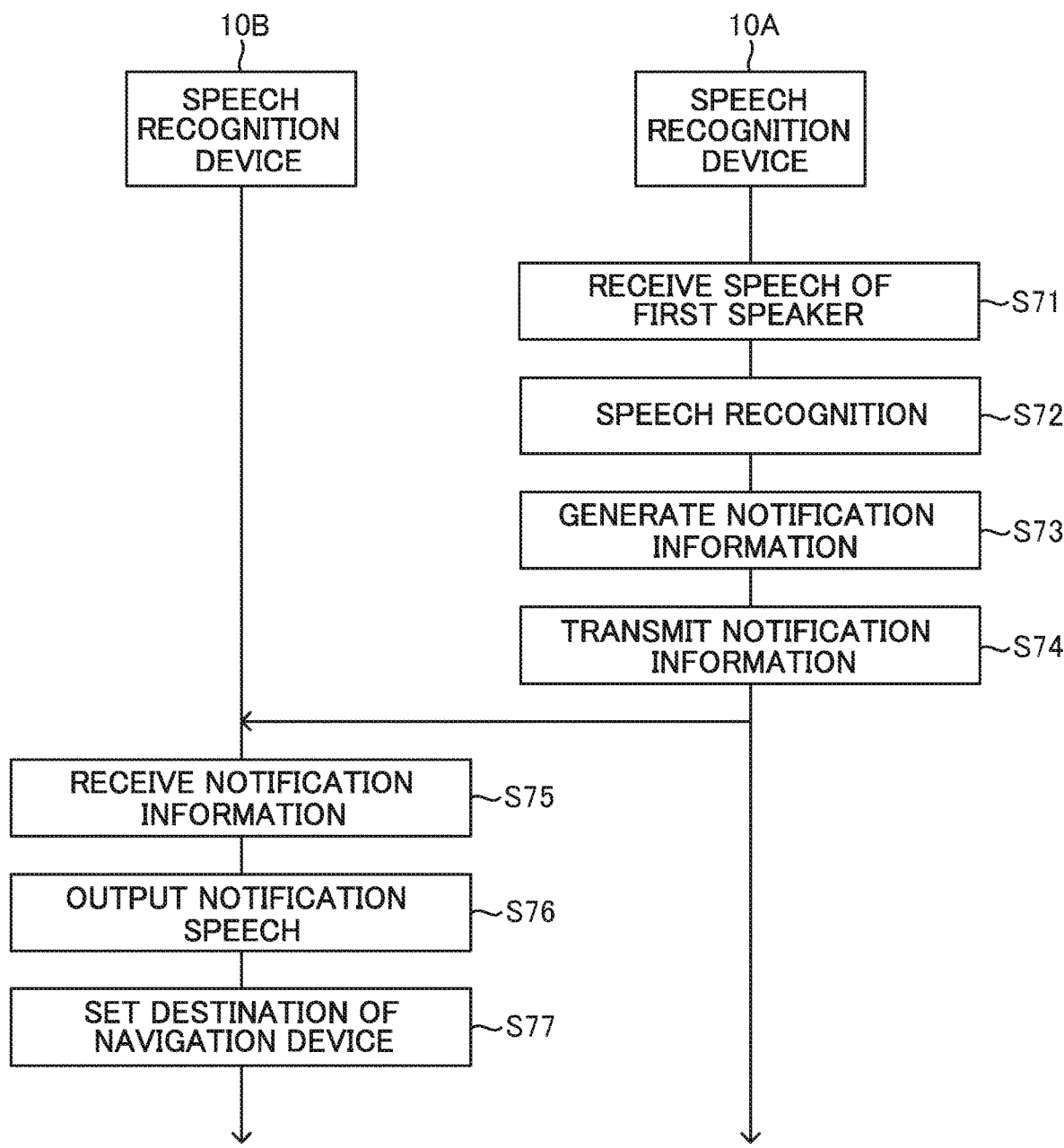
FIG. 15 is a sequence chart illustrating an example of a flow of processing executed by speech recognition devices according to the third exemplary embodiment of the present disclosure.

Explanation follows regarding operation of the communication system 1 according to the present exemplary embodiment. FIG. 15 is a sequence chart illustrating an example of a flow of processing executed by the speech recognition devices 10A and 10B.

At step S71, the speech input section 16A of the speech recognition device 10A receives input of speech uttered by the first speaker.

When speech has been input to the speech input section 16A of the speech recognition device 10A, at step S72, the CPU 11A of the speech recognition device 10A functions as the speech recognition section 30A by executing the speech recognition program 20A to recognize the input speech.

At step S73, the CPU 11A of the speech recognition device 10A functions as the information generation section 31A by executing the information generation program 21A to generate notification information corresponding to the speech recognized by the speech recognition section 30A.

At step S74, the CPU 11A of the speech recognition device 10A transmits the generated notification information to the speech recognition device 10B via the communication I/F 14A.

At step S75, the CPU 11B of the speech recognition device 10B' receives the notification information transmitted from the speech recognition device 10A via the communication I/F 14B.

At step S76, the CPU 11B of the speech recognition device 10B functions as the speech output control section 32B by executing the speech output control program 22B to output notification speech corresponding to the notification information transmitted from the speech recognition device 10A from the speech output section 17B at a specific timing. In the present exemplary embodiment, the speech output control section 32B outputs the notification speech corresponding to the received notification information from the speech output section 17B when the second speaker is on board the vehicle V.

At step S77, the CPU 11B of the speech recognition device 10B functions as the destination setting section 34B by executing the destination setting program 24B to set a destination of the navigation device 40 connected to the speech recognition device 10B based on the request of the second speaker in response to the notification information content transmitted from the speech recognition device 10A.

Figure 16:
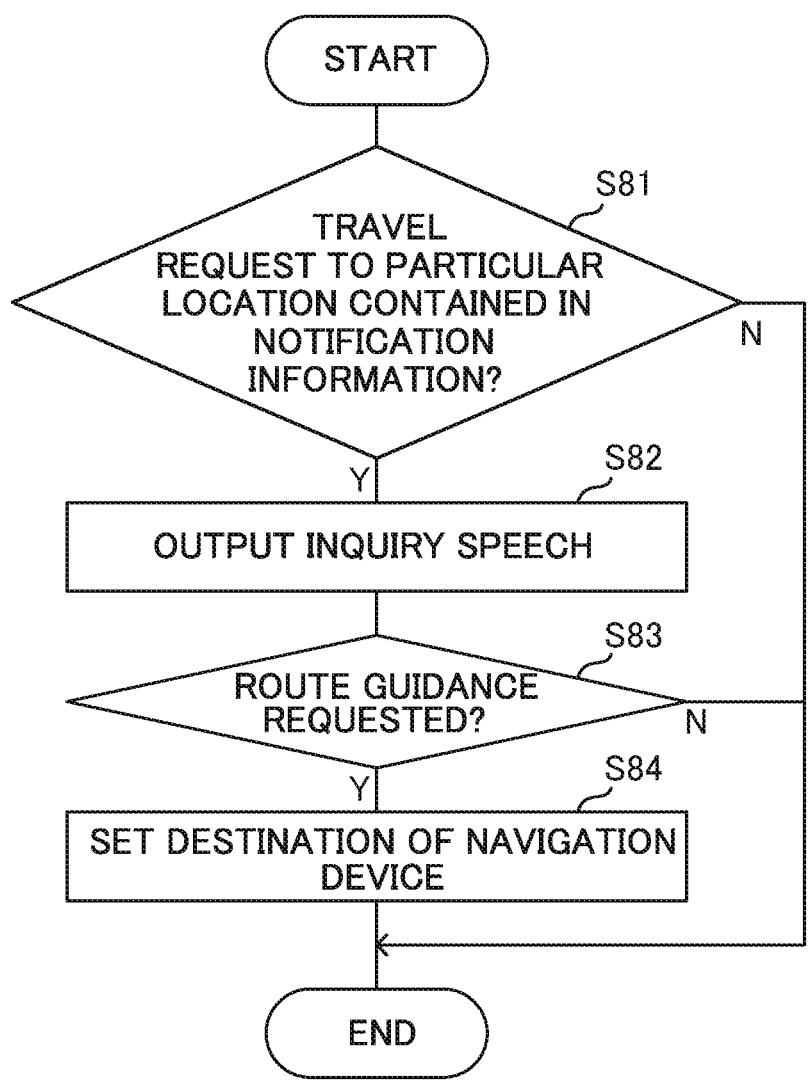
FIG. 16 is a flowchart illustrating an example of a flow of destination setting processing executed by a destination setting section according to the third exemplary embodiment of the present disclosure.

FIG. 16 is a flowchart illustrating an example of a flow of destination setting processing executed by the destination setting section 34B. At step S81, the CPU 11B functions as the destination setting section 34B to determine whether or not the notification information transmitted from the speech recognition device 10A contains content requesting the second speaker to travel to a particular location (hereafter referred to as a travel request). In cases in which the CPU 11B determines that the notification information contains a travel request to a particular location, processing transitions to step S82. In cases in which the CPU 11B determines that the notification information does not contain a travel request to a particular location, the present routine is ended.

At step S82, the CPU 11B outputs inquiry speech from the speech output section 17B to inquire whether route guidance to the particular location is required. At step S83, the CPU 11B determines whether or not a response to the inquiry speech input to the speech input section 16B is a request for route guidance. In cases in which the CPU 11B determines that the response to the inquiry speech is a request for route guidance, processing transitions to step S84. In cases in which the CPU 11B determines that the response to the inquiry speech is not a request for route guidance, the present routine is ended. At step S84, the CPU 11B sets the particular location designated by the travel request as the destination of route guidance executed by the navigation device 40 connected to the speech recognition device 10B.

The communication system 1 according to the present exemplary embodiment enables the destination of the navigation device 40 installed in the vehicle V to be set based on speech of the first speaker (for example a wife) at home in the house H. Thus, for example, the communication system 1 according to the present exemplary embodiment may be utilized such that; when the first speaker (the wife) at home in the house H asks the second speaker (for example a husband) on board the vehicle V to purchase a product at a particular store, the request content is conveyed via the communication system 1, and the particular store is set as the destination of the navigation device 40.

For example, if the speech of the first speaker (the wife) to the speech recognition device 10A installed in the house contains a request that the second speaker purchase a product at a particular store, notification information containing the speech content of the first speaker (the wife) is generated and transmitted to the speech recognition device 10B via the network N. Notification speech such as "Please go to (store name) to buy (product name)" is output from the speech output section 17B of the speech recognition device 10B at a timing when the second speaker (the husband) is on board the vehicle V. Inquiry speech, for example "Shall I provide route guidance to (store name)?" is also output from the speech output section 17B. If the second speaker (the husband) responds to the inquiry speech with a request for route guidance, the particular store is set as the destination of the navigation device 40.

Moreover, in the communication system according to the second exemplary embodiment, on informing the second speaker (the husband) on board the vehicle V of an item of interest to the first speaker (the wife) at home in the house H, a store where a product that matches the item of interest to the first speaker may be purchased may be set as the destination of the navigation device 40.

Note that in the above exemplary embodiment, an example is given in which the information generation section 31A is provided to the speech recognition device 10A, and the speech output control section 32B and the destination setting section 34B are provided to the speech recognition device 10B. However, the information generation section 31A, the speech output control section 32B, and the destination setting section 34B may be provided to a server (not illustrated in the drawings) connected to the network N.

Fourth Exemplary Embodiment

Figure 17:
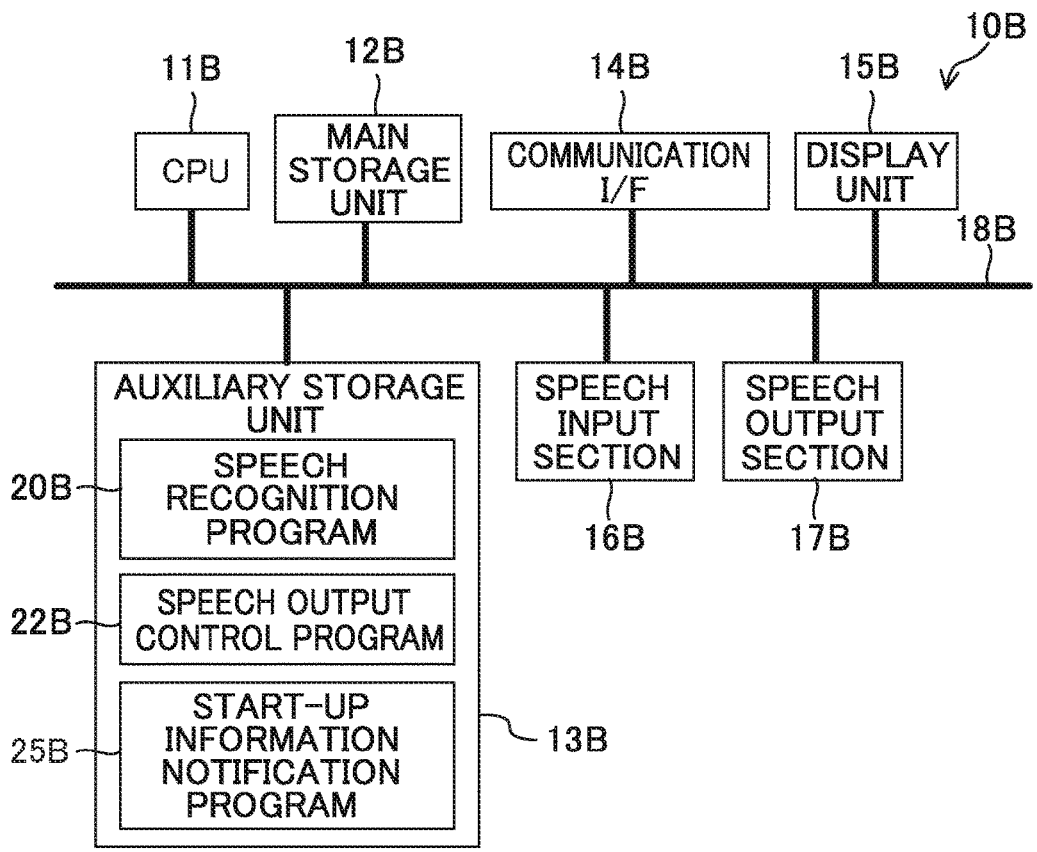
FIG. 17 is a diagram illustrating an example of a hardware configuration of a speech recognition device according to a fourth exemplary embodiment of the present disclosure.

FIG. 17 is a diagram illustrating an example of a hardware configuration of a speech recognition device 10B according to a fourth exemplary embodiment of the present disclosure. The speech recognition device 10B according to the present exemplary embodiment differs from the speech recognition device 10B according to the first exemplary embodiment (see FIG. 2B) in the respect that it further includes a start-up information notification program 25B stored in the auxiliary storage unit 13B.

Figure 18:
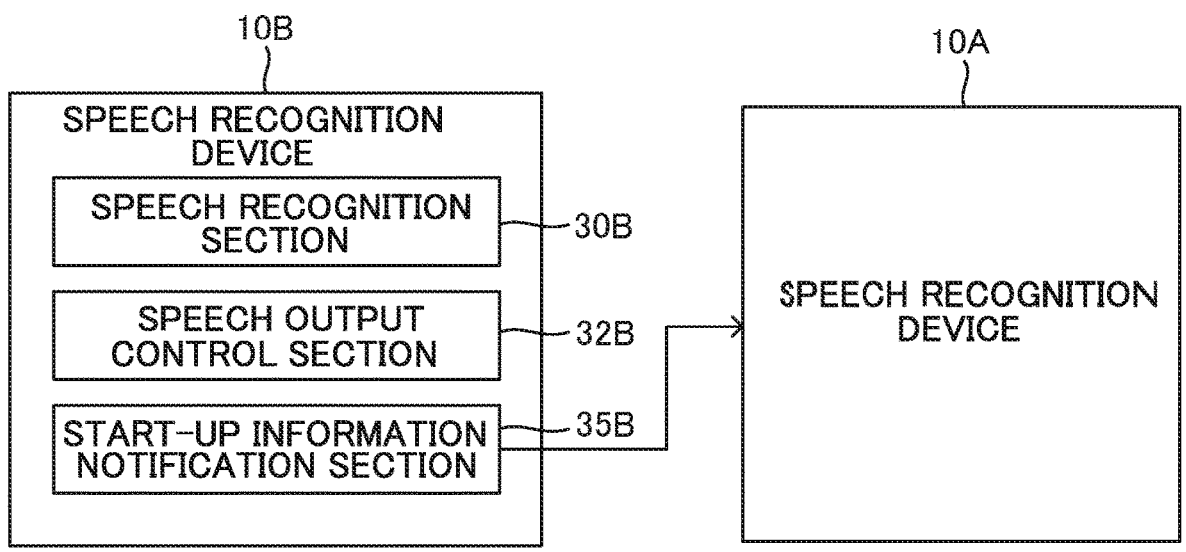
FIG. 18 is a functional block diagram illustrating functional configuration of speech recognition devices according to the fourth exemplary embodiment of the present disclosure.

FIG. 18 is a functional block diagram illustrating functional configuration of the speech recognition device 10B according to the fourth exemplary embodiment of the present disclosure. The speech recognition section 30B includes a start-up information notification section 35B. The CPU 11B of the speech recognition device 10B functions as the start-up information notification section 35B by executing the start-up information notification program 25B.

On detecting that the vehicle V has been started up, the start-up information notification section 35B transmits start-up information indicating that the vehicle V has been started up to the speech recognition device 10A. The speech output section 17A of the speech recognition device 10A that has received the start-up information outputs speech corresponding to the start-up information.

Figure 19:
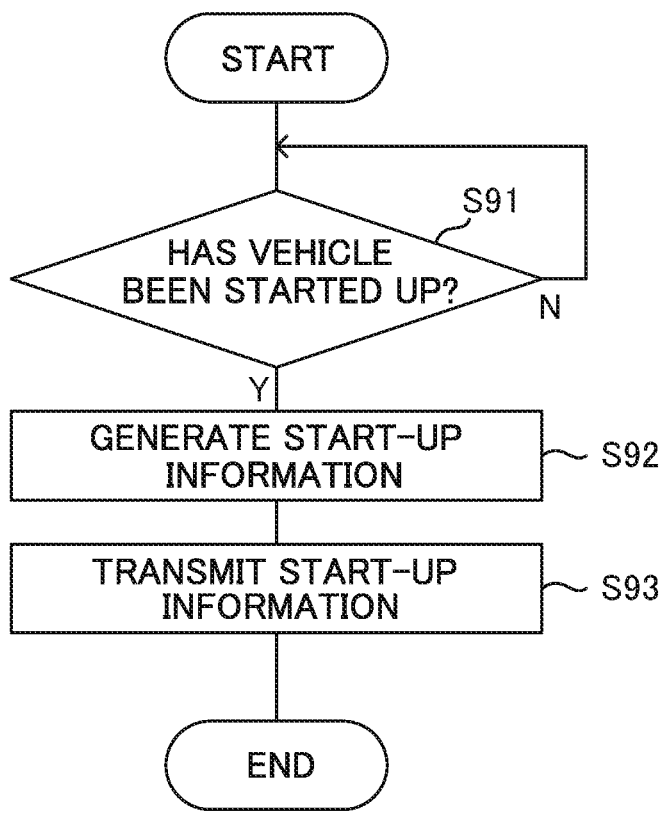
FIG. 19 is a flowchart illustrating an example of a flow of start-up information notification processing executed by a start-up information notification section according to the fourth exemplary embodiment of the present disclosure.

FIG. 19 is a flowchart illustrating an example of a flow of start-up information notification processing executed by the start-up information notification section 35B.

At step S91, the CPU 11B functions as the start-up information notification section 35B to determine whether or not the vehicle V has been started up. For example, if the speech recognition device 10B is connected to the ECU of the vehicle V so as to be capable of wired or wireless communication, the CPU 11B may determine that the vehicle V has been started up when information indicating that the engine of the vehicle V has been started up has been acquired from the ECU.

In cases in which start-up of the vehicle V has been detected, at step S92, the CPU 11B generates start-up information indicating that the vehicle V has been started up.

At step S93, the CPU 11B transmits the generated start-up information to the speech recognition device 10A.

On receiving the start-up information transmitted from the speech recognition device 10B, the speech recognition device 10A outputs speech from the speech output section 17A informing that the vehicle V has been started up.

In the communication system 1 according to the present exemplary embodiment, when the vehicle V installed with the speech recognition device 10B has been started up, speech informing that the vehicle V has been started up is output from the speech output section 17A of the speech recognition device 10A. Thus, for example, the communication system 1 according to the present exemplary embodiment may be utilized to inform the first speaker (for example a wife) at home in the house H that the second speaker (for example a husband) on board the vehicle V will soon return home, by notifying the first speaker that the vehicle V has been started up.

Note that in the above exemplary embodiment, an example is given in which the start-up information notification section 35B is provided to the speech recognition device 10B; however, the start-up information notification section 35B may be provided to a server (not illustrated in the drawings) connected to the network N.

Fifth Exemplary Embodiment

Figure 20A:
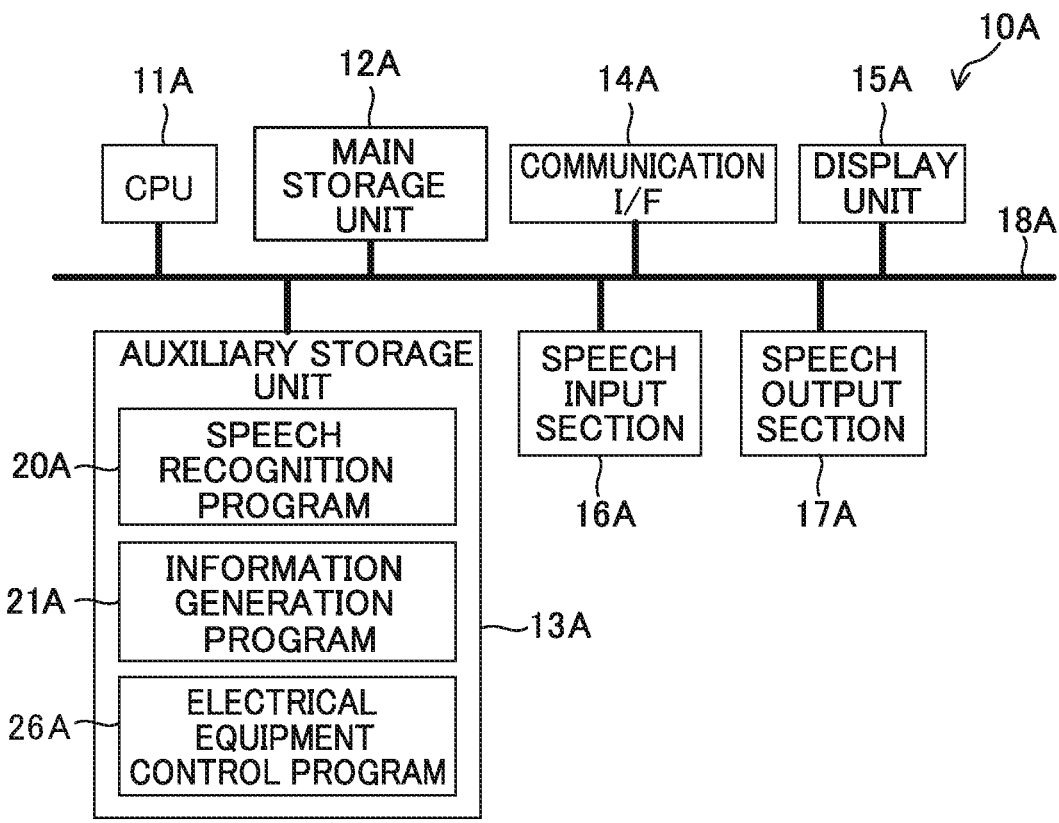
FIG. 20A is a diagram illustrating an example of a hardware configuration of a speech recognition device according to a fifth exemplary embodiment of the present disclosure.

FIG. 20A is a diagram illustrating an example of a hardware configuration of a speech recognition device 10A according to a fifth exemplary embodiment of the present disclosure. The speech recognition device 10A according to the present exemplary embodiment differs from the speech recognition device 10A according to the first exemplary embodiment (see FIG. 2A) in the respect that it further includes an electrical equipment control program 26A stored in the auxiliary storage unit 13A.

Figure 20B:
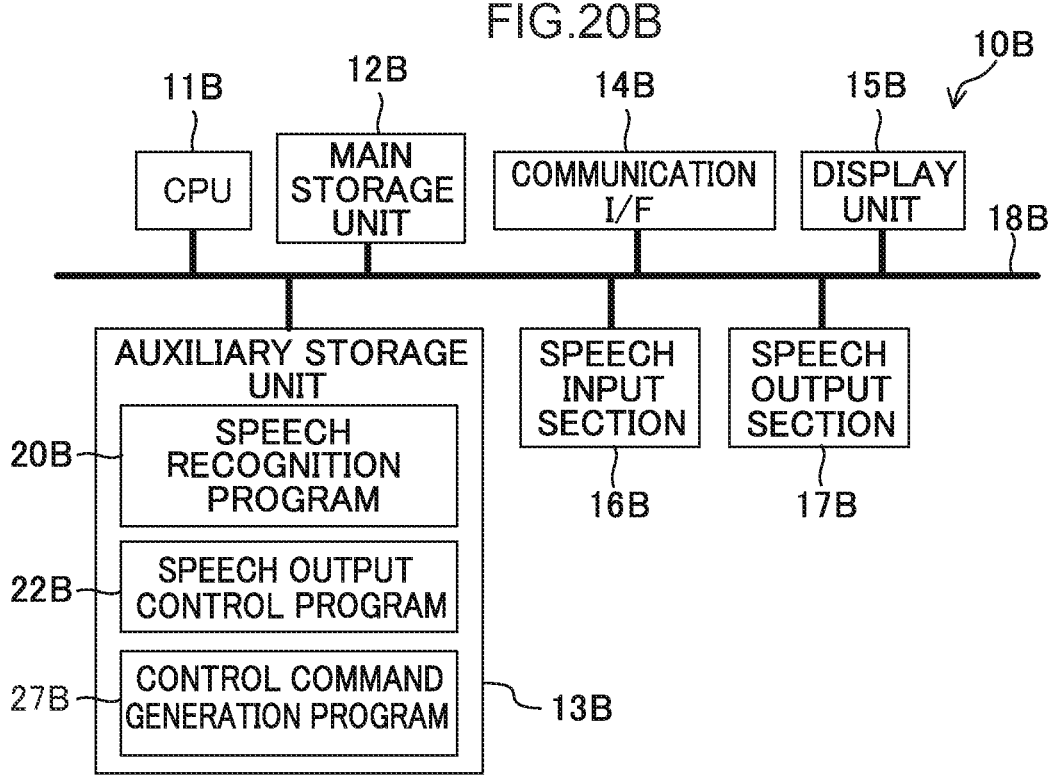
FIG. 20B is a diagram illustrating an example of a hardware configuration of a speech recognition device according to the fifth exemplary embodiment of the present disclosure.

FIG. 20B is a diagram illustrating an example of a hardware configuration of a speech recognition device 10B according to the fifth exemplary embodiment of the present disclosure. The speech recognition device 10B according to the present exemplary embodiment differs from the speech recognition device 10B according to the first exemplary embodiment (see FIG. 2B) in the respect that it further includes a control command generation program 27B stored in the auxiliary storage unit 13B.

FIG. 21 is a functional block diagram illustrating functional configuration of the speech recognition devices 10A and 10B according to the fifth exemplary embodiment of the present disclosure. The speech recognition section 30A includes an electrical equipment control section 36A. The CPU 11A of the speech recognition device 10A functions as the electrical equipment control section 36A by executing the electrical equipment control program 26A. The speech recognition section 30B includes a control command generation section 37B. The CPU 11B of the speech recognition device 10B functions as the control command generation section 37B by executing the control command generation program 27B.

In cases in which an instruction to operate electrical equipment 50 connected to the speech recognition device 10A is contained in speech recognized by the speech recognition section 30B of the speech recognition device 10B, the control command generation section 37B generates a control command to control the electrical equipment 50 corresponding to the operation instruction. The control command is transmitted to the speech recognition device 10A. On receiving the control command transmitted from the speech recognition device 10B, the electrical equipment control section 36A controls the electrical equipment 50 according to the control command.

Explanation follows regarding operation of the communication system 1 according to the present exemplary embodiment, with reference to the sequence chart illustrated in FIG. 22.

At step S101, the speech input section 16B of the speech recognition device 10B receives input of speech uttered by the second speaker.

When speech has been input to the speech input section 16B of the speech recognition device 10B, at step S102, the CPU 11B of the speech recognition device 10B functions as the speech recognition section 30B by executing the speech recognition program 20B to recognize the input speech by converting the speech to text data.

At step S103, the CPU 11B of the speech recognition device 10B functions as the control command generation section 37B by executing the control command generation program to generate a control command corresponding to the recognized speech content.

Figure 23:
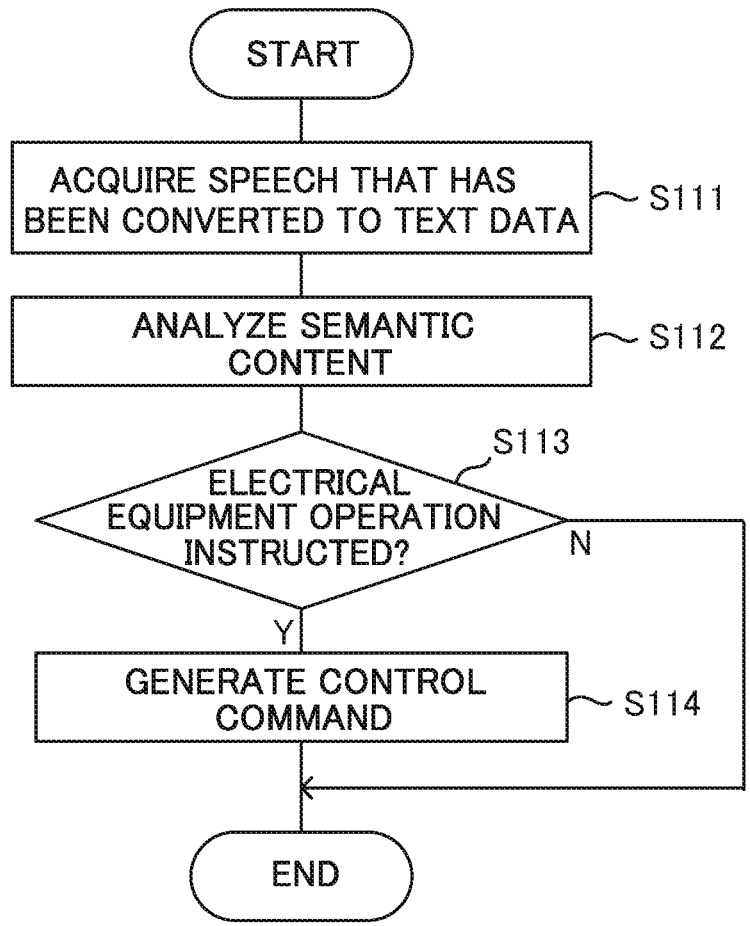
FIG. 23 is a flowchart illustrating an example of a flow of control command generation processing executed by a control command generation section according to the fifth exemplary embodiment of the present disclosure.

FIG. 23 is a flowchart illustrating an example of a flow of control command generation processing executed by the control command generation section 37B. At step S111, the CPU 11B functions as the control command generation section 37B to acquire the speech that has been converted to text data by the speech recognition section 30B. At step S112, the CPU 11B comprehends the semantic content of the speech that has been converted to text data by performing known morpheme analysis, phrase analysis, syntax analysis, and semantic analysis on the speech. At step S113, the CPU 11B determines whether or not an instruction to operate the electrical equipment 50 is contained in the speech. In cases in which the CPU 11B determines that an instruction to operate the electrical equipment 50 is contained in the speech, processing transitions to step S114. In cases in which the CPU 11B determines that an instruction to operate the electrical equipment 50 is not contained in the speech, the present routine is ended. At step S114, the CPU 11B generates a control command to perform control corresponding to the instruction to operate the electrical equipment 50.

At step S104, the CPU 11B transmits the control command to the speech recognition device 10A via the communication I/F 14B.

At step S105, the CPU 11A of the speech recognition device 10A receives the control command transmitted from the speech recognition device 10B via the communication I/F 14A.

At step S106, the CPU 11A of the speech recognition device 10A functions as the electrical equipment control section 36A by executing the electrical equipment control program 26A to control the electrical equipment 50 according to the control command transmitted from the speech recognition device 10B.

Figure 24:
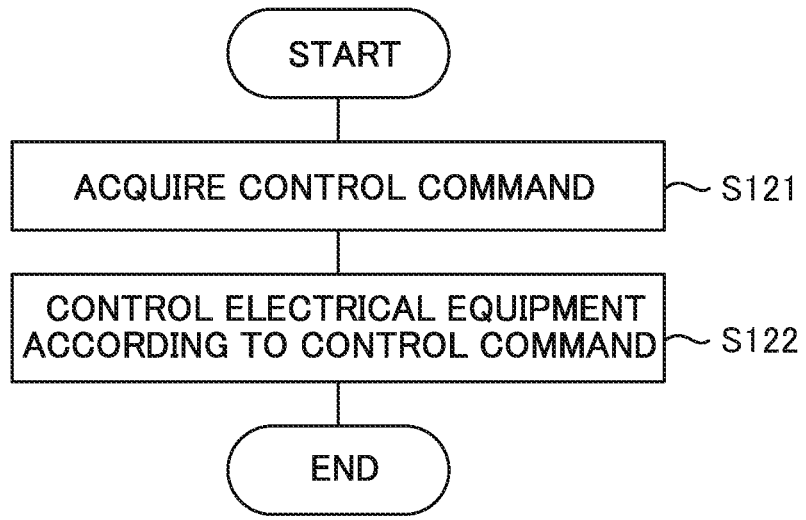
FIG. 24 is a flowchart illustrating an example of a flow of electrical equipment control processing executed by an electrical equipment control section according to the fifth exemplary embodiment of the present disclosure.

FIG. 24 is a flowchart illustrating an example of a flow of electrical equipment control processing executed by the electrical equipment control section 36A. At step S121, the CPU 11A functions as the electrical equipment control section 36A to acquire the control command transmitted from the speech recognition device 10B. At step S122, the CPU 11A controls the electrical equipment 50 according to the control command.

The communication system 1 according to the present exemplary embodiment enables electrical equipment installed in the house H to be controlled by the speech of the second speaker on board the vehicle V. Thus, for example, the communication system 1 according to the present exemplary embodiment may be utilized to activate an air conditioning unit, serving as the electrical equipment 50 that is installed in the house H and connected to the speech recognition device 10A, prior to the second speaker arriving home. Note that there is no particular limitation to the type of electrical equipment 50, other examples besides the air conditioning unit including lighting equipment, acoustic equipment, a television, and a robotic vacuum cleaner.

Note that in the above exemplary embodiment, an example is given in which the electrical equipment control section 36A is provided to the speech recognition device 10A, and the control command generation section 37B is provided to the speech recognition device 10B. However, the electrical equipment control section 36A and the control command generation section 37B may be provided to a server (not illustrated in the drawings) connected to the network N.

What is claimed is:

1. A communication system comprising:
a pair of speech recognition devices that are capable of communicating with each other, each of the speech recognition devices including a speech input section into which speech is input, a speech recognition section that recognizes speech input to the speech input section, and a speech output section that outputs speech;
an information generation section of a first speech recognition device from out of the pair of speech recognition devices that generates notification information corresponding to speech recognized by the speech recognition section in the first speech recognition device from out of the pair of speech recognition devices; and
a speech output control section that performs control to output notification speech corresponding to the notification information at a specific timing from the speech output section of a second speech recognition device from out of the pair of speech recognition devices.

2. The communication system of claim 1, wherein:
the speech output control section performs control to output the notification speech in cases in which an occupant is on board a vehicle installed with the second speech recognition device, or on board a vehicle into which the second speech recognition device has been brought.

3. The communication system of claim 1, further comprising:
a schedule information acquisition section that acquires schedule information, wherein:
the speech output control section performs control to output the notification speech at a timing corresponding to a diary event indicated by schedule information acquired by the schedule information acquisition section.

4. The communication system of claim 1, wherein as the notification information, the information generation section generates a summary of speech content recognized by the speech recognition section of the first speech recognition device.

5. The communication system of claim 1, wherein:
as the notification information, the information generation section generates information indicating an item of interest to a speaker who generated the speech, as inferred by speech content recognized by the speech recognition section of the first speech recognition device.

6. The communication system of claim 1, further comprising:
a destination setting section that outputs inquiry speech, inquiring whether route guidance to a particular location is required, from the speech output section of the second speech recognition device based on the notification information, and, in cases in which a response to the inquiry speech as recognized by the speech recognition section of the second speech recognition device is a request for route guidance, sets the particular location as a destination of route guidance executed by a navigation device connected to the second speech recognition device.

7. The communication system of claim 1, further comprising:
a start-up information notification section that, on detection of start-up of a vehicle installed with one speech recognition device from out of the pair of speech recognition devices, or of a vehicle into which one speech recognition device from out of the pair of speech recognition devices has been brought, notifies the other speech recognition device from out of the pair of speech recognition devices with start-up information indicating that the vehicle has been started up, wherein:
the speech output section of the speech recognition device that, from out of the pair of speech recognition devices, has been notified with the start-up information outputs speech corresponding to the start-up information.

8. The communication system of claim 1, further comprising:
an electrical equipment control section that, in cases in which speech recognized by the speech recognition section of one speech recognition device from out of the pair of speech recognition devices contains an operation instruction regarding electrical equipment connected to the other speech recognition device from out of the pair of speech recognition devices, controls the electrical equipment based on the operation instruction.

9. A non-transitory computer-readable storage medium storing a program that causes a computer to function as the speech output control section of the communication system of claim 1.

10. A communication method of a communication system including a pair of speech recognition devices that are capable of communicating with each other and that each includes a speech input section into which speech is input, a speech recognition section that recognizes speech input to the speech input section, and a speech output section that outputs speech, the communication method comprising:
generating notification information corresponding to speech recognized by the speech recognition section of a first speech recognition device from out of the pair of speech recognition devices; and
outputting notification speech corresponding to the notification information at a specific timing from the speech output section of a second speech recognition device from out of the pair of speech recognition devices.

* * * * *